United States Patent [19]

Budike, Jr.

[11] Patent Number: 6,122,603
[45] Date of Patent: Sep. 19, 2000

[54] MULTI-UTILITY ENERGY CONTROL SYSTEM WITH DASHBOARD

[75] Inventor: Lothar E. S. Budike, Jr., Hamilton Township, Mercer County, N.J.

[73] Assignee: Powerweb, Inc., Wallingford, Pa.

[21] Appl. No.: 09/095,730

[22] Filed: Jun. 10, 1998

Related U.S. Application Data

[63] Continuation-in-part of application No. 09/087,621, May 29, 1998.

[51] Int. Cl.$^7$ .................................................. G01R 21/00
[52] U.S. Cl. ................. 702/182; 340/870.02; 705/412; 702/61; 702/188
[58] Field of Search ................................ 702/182, 187, 702/188, 61, 62; 364/528.21, 528.26; 705/400, 412; 96/422; 340/870.02

[56] References Cited

U.S. PATENT DOCUMENTS

| Re. 35,793 | 5/1998 | Halpern ................................ 364/483 |
| 3,872,286 | 3/1975 | Putman . |
| 4,110,825 | 8/1978 | Fox et al. . |
| 4,153,936 | 5/1979 | Schmitz et al. . |
| 4,163,218 | 7/1979 | Wu . |
| 4,661,914 | 4/1987 | Mulokey et al. . |
| 4,749,992 | 6/1988 | Fitzmeyer et al. . |
| 4,783,748 | 11/1988 | Swarztranber et al. . |
| 4,924,404 | 5/1990 | Reinke, Jr. . |
| 5,089,974 | 2/1992 | Demeyer et al. . |
| 5,153,837 | 10/1992 | Shaffer et al. . |
| 5,216,623 | 6/1993 | Barrett et al. ........................ 364/550 |
| 5,404,136 | 4/1995 | Marsden . |
| 5,420,741 | 5/1995 | Ushiyama et al. . |
| 5,424,958 | 6/1995 | Knupp . |
| 5,432,710 | 7/1995 | Ishimaru et al. . |
| 5,436,513 | 7/1995 | Kaye et al. . |
| 5,459,459 | 10/1995 | Lee, Jr. . |
| 5,462,225 | 10/1995 | Massara et al. . |
| 5,483,672 | 1/1996 | Sasuta . |
| 5,495,129 | 2/1996 | Schou et al. . |
| 5,512,831 | 4/1996 | Cisar et al. . |
| 5,517,188 | 5/1996 | Carroll et al. . |
| 5,528,123 | 6/1996 | Hutchison . |
| 5,537,339 | 7/1996 | Naganuma et al. . |
| 5,566,084 | 10/1996 | Cmar ........................................ 364/492 |
| 5,621,654 | 4/1997 | Cohen et al. . |
| 5,696,501 | 12/1997 | Ouellette et al. .................... 340/870.02 |
| 5,758,331 | 5/1998 | Johnson .................................. 705/412 |

Primary Examiner—Patrick Assouad
Attorney, Agent, or Firm—Kenneth P. Glynn, Esq.

[57] ABSTRACT

A multi-utility energy control system has control center computer(s) connected to various utility consuming systems and software that formats pertinent systems' energy data, stores, retrieves, diagnoses and acts in response to changes and includes a multi-utility master meter device and a plurality of sensors. The system includes at least one dashboard screen as a control screen, and a plurality of interconnected utility related subscreens. The meter device and sensors monitor consumption of a plurality of different utilities and will generate selected information, including recognition of surges, of increase in usage versus historical data. The master meter has a CPU, visual display means, programming controls and a power source connection. The sensors connections transmit real time rates to the master meter central processing unit. The control center computer (s) identify consumption, changes in consumption, changes in facility individual system consumption and identify and correct for surges, gaps, peak demands and other data, with reports as desired.

40 Claims, 31 Drawing Sheets

ELECTRICAL INFO FROM METER
~291

FREEHOLD CENTRAL OFFICE

TOTAL FACILITY REAL TIME CONSUMPTION

| | | | |
|---|---|---|---|
| ACTIVE Kw | 6133 | DAILY Kwh | 4958 |
| LAST INTERVAL Kw | 349 | YESTERDAY Kwh | 9799 |
| DAILY PEAK Kw | 457 | MONTHLY Kwh | 17630 |
| MONTHLY PEAK | 587 | YEARLY Kwh | 680382 |
| | 637 | | |

OTHER UTILITIES REAL TIME CONSUMPTION

| GAS CONSUMPTION | 909 | ccf |
|---|---|---|
| STEAM CONSUMPTION | 605 | %mlb |
| STEAM DEMAND | 452 | MLB |
| OIL CONSUMPTION | 103 | Gal. |
| DAILY WATER CONSUMPTION | 9682 | Gal. |
| OUTDOOR TEMPERATURE | 73 | 0 |
| INDOOR TEMPERATURE | 72 | 0 |
| OUTDOOR HUMIDITY | 60 | % |

ONNET

[ELECTRIC] [OIL] [GAS] [WATER] [STEAM]

ELECTRICAL SITE SERVER

RETURN

MAIN BUILDING FEEDS
| | PHASE 1 | PHASE 2 | PHASE 3 |
|---|---|---|---|
| VOLTS | 277.00 | 277.00 | 277.00 |
| AMPS | 323.70 | 319.06 | 322.06 |
| Kw | 80.60 | 81.07 | 82.42 |
| Kwh | 1934.30 | 1945.49 | 1978.33 |
| POWER FACTOR | 0.90 | 0.92 | 0.92 |
| HARMONIC | | | |
| HVAC | 39.29 | 35.20 | 34.13 |
| HVA | 89.67 | 88.38 | 89.21 |

MAIN HVAC BUILDING LOAD
| | PHASE 1 | PHASE 2 | PHASE 3 |
|---|---|---|---|
| VOLTS | 277.00 | 277.00 | 277.00 |
| AMPS | 38.54 | 38.54 | 38.54 |
| Kw | 9.65 | 9.65 | 9.65 |
| Kwh | 231.62 | 231.62 | 231.62 |
| POWER FACTOR | 0.90 | 0.90 | 0.90 |
| HARMONIC | | | |
| HVAC | 4.58 | 4.58 | 4.58 |
| HVA | 10.68 | 10.68 | 10.68 |

MAIN LIGHTING BUILDING LOAD
| | PHASE 1 | PHASE 2 | PHASE 3 |
|---|---|---|---|
| VOLTS | 277.00 | 277.00 | 277.00 |
| AMPS | 6.17 | 6.17 | 6.17 |
| Kw | 1.48 | 1.48 | 1.48 |
| Kwh | 70.81 | 70.81 | 70.81 |
| POWER FACTOR | 0.87 | 0.87 | 0.87 |
| HARMONIC | | | |
| HVAC | 13.75 | 13.75 | 13.75 |
| HVA | 1.71 | 1.71 | 1.71 |

MAIN C/O CARRIER BUILDING
| | PHASE 1 | PHASE 2 | PHASE 3 |
|---|---|---|---|
| VOLTS | 277.00 | 277.00 | 277.00 |
| AMPS | 147.71 | 147.71 | 147.71 |
| Kw | 38.54 | 38.54 | 38.54 |
| Kwh | 925.03 | 925.03 | 925.03 |
| POWER FACTOR | 0.94 | 0.94 | 0.94 |
| HARMONIC | | | |
| HVAC | 13.75 | 13.75 | 13.75 |
| HVA | 40.91 | 40.91 | 40.91 |

MAIN FRAME BUILDING LOAD
| | PHASE 1 | PHASE 2 | PHASE 3 |
|---|---|---|---|
| VOLTS | 277.00 | 277.00 | 277.00 |
| AMPS | 131.28 | 126.64 | 129.64 |
| Kw | 30.93 | 31.41 | 32.76 |
| Kwh | 706.83 | 718.02 | 750.86 |
| POWER FACTOR | 0.85 | 0.90 | 0.91 |
| HARMONIC | | | |
| HVAC | 19.12 | 15.63 | 14.71 |
| HVA | 36.37 | 35.08 | 35.91 |

MULTI-UTILITY ENERGY CONTROL SYSTEM WITH DASHBOARD

REFERENCE TO RELATED CASE

This is a continuation-in-part of U.S. pending patent application Ser. No. 09/087,621, filed on May 29, 1998, entitled Multi-Utility Energy Control System, by the same inventor herein.

BACKGROUND OF THE INVENTION

1. Field of the Invention

The present invention is directed to a multi-utility energy control system with a dashboard screen, which includes a control center computer, specialized software, including the dashboard screen and various unique subscreens, and a master meter. More particularly, the meter retrofits a plurality of various meters, senses consumption rates and stores, converts and presents data for consumption information to the computer, and the specialized software. The multi-utility master meter converts data to usable computer language with outputs to one or more computers for long-term storage of individual utility consumption information, and for feedback, regulation and shutdowns utilizing the specialized software. The dashboard screen and subscreens permit unique, easy access to information by focusing on selected sites and utilities to provide quick analysis, real time information and efficient, cost effective energy supply decisions.

2. Information Disclosure Statement

The following is exemplary prior art relating to utility consumption sensing and control devices:

U.S. Pat. No. 5,621,654 describes methods and systems for economically dispatching electrical power. The present invention utilizes real-time heat rates for a plurality of power generating units, e.g., steam turbines, and corresponding emission data for each unit, to dispatch electrical power at the lowest possible cost. The method of the present invention also compares the cost associated with generating power to the cost to purchase power from other electric utilities to achieve maximum cost savings associated with the dispatching of electrical power.

U.S. Pat. No. 5,537,339 describes how to operate a plurality of utilities, the utilities are interconnected via a communication path. Each utility has a control device for controlling the utility and a memory for storing information factors which are used by the corresponding control device. The information factors corresponding to all the utilities are investigated by an extraction device to determine which are common to the utilities and which are related. Where the common information factors are identified, they are passed by the communication path to the memories of all the utilities. Similarly, when related information factors are found, a calculating device calculates common information which is also passed via the communication path to the memories of al the utilities. In this way, the utilities may operate more efficiently than when they are operated on a stand-alone basis. The investigation of the information factors, and the calculating of common information from related information factors may be distributed among the utilities or carried out by a common control device. The utilities may be electric power supply systems, district heating and cooling systems, sewage disposal systems, waste recovery systems, etc.

U.S. Pat. No. 5,528,123 describes the total line current in a power cord which is used to energize both a power factor corrected system and non-power factor corrected AC loads. The power factor control loop of the power factor corrected system is then driven to correct the power factor of total line current in the power cord ideally to approach unity.

U.S. Pat. No. 5,517,188 describes a programmable identification apparatus, and associated method, includes a transceiver and a transponder. The transponder is powered by the energy of a transceiver transmit signal generated by the transceiver and includes a programmable memory element. A coded sequence which uniquely identifies the transponder is stored in the programmable memory element and, when the transponder is powered, the transponder generates a transponder signal which includes the coded sequence stored in the programmable memory element, once modulated by circuitry of the transponder. When the transceiver transmit signal generated by the transceiver circuitry is of certain signal characteristics, the coded sequence stored in the programmable element is erased, and a substitute coded sequence, which also forms a portion of the transceiver transmit signal, is stored in the programmable memory element. Storage of the coded sequence in the programmable memory element is, hence, effectuated merely by application of a transceiver transmit signal of certain characteristics to the transponder.

U.S. Pat. No. 5,512,831 describes a system for testing electrochemical energy conversion and storage devices includes means for sensing the current from the storage device and varying the load across the storage device in response to the current sensed. The system is equally adaptable to batteries and fuel cells. Means is also provided to sense system parameters from a plurality of locations within the system. Certain parameters are then stored in digital form for archive purposes and certain other parameters are used to develop control signals in a host processor.

U.S. Pat. No. 5,495,129 describes an electronic device for multiplexing several loads to the terminals of a source of alternating is electrical energy. The source of alternating electrical energy is coupled by electromagnetic flux to the loads by using primary excitation windings connect to the terminals of the source of alternating electrical energy and secondary windings respectively corresponding to the number of loads. The secondary windings are at least partially coupled to the primary winding and are each connected to the terminals of a load. The coupling is inhibited by auxiliary winding which are each totally coupled with the secondary winding. The inhibition function is controlled in order to inhibit all the magnetic couplings except for one and this particular one changes as a function of the respective load to be coupled to the source of alternating electrical energy.

U.S. Pat. No. 5,483,672 describes a communication system, a communication unit may conserve source energy when it is inactive in the following manner. The control channel is partitioned into a predetermined number of windows and a system window which are transmitted on the control channel in a round robin manner. When the communication unit registers with the communication system, it is assigned to a window group. The communication unit then monitors only the system window to determine whether the window group that its been assigned to is also assigned to one of the predetermined number of windows. When the window that has been assigned to the window group is being transmitted on the control channel, the communication unit activates to monitor that window. Once the window is no longer being transmitted, the communication unit deactivates until the system window is being transmitted or the window assigned to the window group is being transmitted.

U.S. Pat. No. 5,467,265 describes a system for determining a cost effective and practical operation method for thermal source equipments includes a fundamental plan data storage unit, a fundamental plan generating unit for determining a fundamental operation plan of each equipment while minimizing an operation cost by linear programming, an operation knowledge storage unit for storing operation knowledge such as equipment performance characteristics and operation know-how, a fundamental plan evaluating unit for evaluating the fundamental plan, a modifying rule storage unit for storing modifying rules used for modifying the evaluated fundamental plan, and a fundamental plan modifying unit for modifying the fundamental plan in accordance with the modifying rules.

U.S. Pat. No. 5,462,225 describes an apparatus and method for controlling energy supplied to a space conditioning load and for overriding a load control operation in response to measuring certain space temperatures within a closed environment. The load control apparatus includes a control device connected to an electrical distribution network and to a space conditioning load and a temperature sensing device connected to the control device. The control device conducts a load shedding operation to control distribution of electrical energy to the space conditioning load in response to command signals supplied by a remote command center. The temperature sensing device operates to override the load shedding operation by outputting a control override signal to the control device in response to sensing certain space temperatures within the closed environment. If the temperature control device is connected to an air conditioning system, the temperature sensing device causes the control device to terminate the load shedding operation prior to expiration of a selected time period in response to measuring a space temperature that exceeds a maximum space temperature limit. In contrast, if the temperature control device is connected to a forced air heating system, the temperature sensing device causes the control device to terminate the load shedding operation when a measured space temperature drops below a minimum space temperature limit. The maximum space temperature limit is greater than the control temperature setpoint of a thermostat that controls the space conditioning operations, whereas the minimum space temperature limit is less than the control temperature setpoint.

U.S. Pat. No. 5,459,459 describes an embodiment, is an algorithm for implementation in a meter register and an reading device. In the one embodiment, the present invention enables selecting a display table to be read from the register, updating the billing read date and time in the register, reversing the order in which load profile (LP) data is transmitted from the register to the reader, specifying the number of LP intervals to be read from the register, and specifying the number of intervals to skip when reading from the register.

U.S. Pat. No. 5,436,513 describes an information handling system is described having a power supply having a switching circuit that switches a plurality of energy sources and between series and parallel couplings. Associated with the switching circuit is a voltage level detecting circuit for monitoring the voltage level of the energy sources and. A processor for controlling the information handling system responds to the voltage level detecting circuit and in the event of a low voltage condition, the processor activates the switching circuit to switch the energy sources and from a series to a parallel coupling. Alternatively, processor responds to other inputs or conditions for actuating switching circuit.

U.S. Pat. No. 5,432,710 describes an energy supply system for supplying, in system interconnection, power received at a power receiving equipment from a power plant and power generated by a fuel cell to a power consuming installation, and supplying heat generated by the fuel cell to a heat consuming installation. This system includes an operation amount computing device for computing an amount of operation of the fuel cell to minimize an equation $y=aXL+bXM+cXN$, in response to an energy demand of the power consuming installation and heat consuming installation. A control device controls the fuel cell to satisfy the amount of operation computed. The system supplies energy in optimal conditions with respect to the cost borne by an energy consumer, consumption of primary energy, and release of environmental pollutants. Energy is effectively used from the standpoint of the energy consumer and a national point of view.

U.S. Pat. No. 5,424,958 describes the method allocates a demanded amount of power to a plurality of power output apparatus, each power apparatus having characteristic curves associated therewith, and the total power outputted from the plurality of power apparatus results in a minimum cost for generating the power. Each boiler is allocated a quantity of waste fuel to be used in the generation of power, the quantity of waste fuel to be a predetermined total over a predetermined time period. Data is entered for each of the power apparatus into a controller. Optimal solutions are generated for all valid possible output power demands using an optimization by parts technique within bounds of each power apparatus. The solutions indicate the portion of power each power apparatus is to supply to provide the total power each demanded at minimal cost. The solutions are stored in tables within a storage unit of the controller. Upon receipt of a demand for power, a search is performed of the solution tables to obtain the amount of power each power apparatus is to supply and the amount of waste fuel to use. Control signals are then outputted to each power apparatus, the control signals being indicative of the amount of power to be supplied and the waste fuel to utilize.

U.S. Pat. No. 5,420,741 describes an arrangement for obtaining flux rate information in a magnetic: circuit including passive means connected across a flux rate sensor for implementing control of said flux rate. The passive means being a tuned magnetic flux rate feedback sensing and control arrangement wherein impedance is tuned and the energy loss characteristic is adjustable. The selection of inductance and capacitance values provides tuning and the selection of resistance affects the energy loss characteristics.

U.S. Pat. No. 5,404,136 describes an apparatus and method for monitoring the consumption of utilities in business premises. The premises are divided into notional zones, each including a utility load and a meter to record consumption within the zone. The zones are combined into national groups. A central analysis computer is provided for receiving consumption data from the zones of a group to calculate total utility consumption within the group, and to conduct further analysis on the consumption data. The computer also supplies control data to the zones for controlling utility consumption. A single loss monitoring device records the total losses which occur between a point and the utility loads in the zones. The loss monitoring device transfers this information to the computer. Alternatively, a separate loss monitoring apparatus is supplied for each column of zones for determining the losses which occur in any single column of zones.

U.S. Pat. No. 5,216,623 describes a system for monitoring various, diverse energy characteristics of an energy consuming system. The system includes a data gathering device that accumulates data representing each of the sensed energy characteristics in real time, the data representing magnitude of the sensed energy is characteristic as well as the time at which the magnitude is sensed. The data that is accumulated for each of the sensed energy characteristics is periodically transmitted to a remote analysis station. The remote analysis station performs a detailed analysis of the sensed energy characteristics and generates reports containing summaries of the sensed data in the form of listings of compressed data as well as graphs such as histograms and graphs correlating different energy characteristics of the energy consuming system.

U.S. Pat. No. 5,153,837 describes a digital and analog system for generating an energy log for instant recall and display. The system is permanently programmed in read-only memory with the task of scanning sensor inputs, performing consumption calculations, updating the non-volatile memory, responding to external commands, and monitoring peripheral performance. The stored information is available for real-time query of individual sensor data or as a composite hard copy report on a month-to-date or month-end basis. The apparatus accepts inputs from both analog and digital sensors whose outputs produce information related to data such as current consumption, water consumption, or fuel consumption and provides an optional interface for the control of these functions based on preprogrammed upper/lower limits. Based on the various inputs, data is stored in specified memory locations and consumption rates and costs are computed based on sensor calibration factors and energy cost factors stored in non-volatile memory at the time of calibration. The system is programmed to detect invalid data and failed sensor inputs in addition to automatically calibrating.

U.S. Pat. No. 5,089,974 describes a building power management controller comprises a plurality of modules connected by a two-wire network. Each module comprises a data transceiver device, controlled by a microprocessor to both transmit data to the other modules and to a central unit via the two-wire network, and to receive information via this two-wire network. The modules are supplied with power by the two-wire network. When the two modules transmit simultaneously, one takes priority so as not to disturb the messages transmitted.

U.S. Pat. No. 4,924,404 describes an energy monitor for monitoring energy consumed by each of a plurality of energy consuming devices which is disclosed. The energy monitor comprises a processor, a memory, means for storing energy usage rate data in the memory, the energy usage rate data representing a rate of energy consumed by each of the devices, means for determining when each of the devices is operating, means responsive to the storing means and the determining means for calculating energy consumption numbers representing a quantity of energy consumed by each device while each of the devices is operating and means for selectively displaying each of the energy consumption numbers.

U.S. Pat. No. 4,783,748 describes a method and apparatus which are disclosed for sensing, sampling and performing calculations on a parameter of a physical quantity at a plurality of remote locations comprising a plurality of remote sensing units and at least one processing unit linked to said plurality of remote sensing units via a two way communication link. Parameters of a physical quantity are sensed and sampled, calculations are performed and accumulated and transmitted, on demand, provided to the processing unit using a plurality of frequency bands one of which is identified as having valid data.

U.S. Pat. No. 4,749,992 describes a remote utility reading and control system incudes a central utility use data bank which communicates by communications link with a plurality of relay modules located at power sub-distribution transformers. Each relay module separately addresses and communicates by PLC with a number of site units in its locality. The site units may include on/off controls for buildings, light systems or single pieces of equipment, or may include utility meters or real power meters. The PLC communication utilizes error checking and message verifying to acquire valid status or measurement signals, which are then transmitted to the central data bank. A CRC error code identifies faulty messages. After multiple interrogation, five responses are stored, and a message is confirmed only when three of five responses are identical. Systems for electricity, water, and gas are described.

U.S. Pat. No. 4,661,914 describes an energy management controller is coupled via a clock line pair, a "data out" line pair and a "data in" line pair, to a plurality or group of stations each having energy using equipment. Each station is electrically coupled to each line pair at spaced points along the line pairs. Each station counts the number of clock bits from the controller. After each group of a predetermined number of clock bits are received, each station provides an address count that is incremented by one after each group of clock bits are received. By setting each station to a different address count and enabling each station to transmit and receive data only during its respective address count period each station can be individually accessed by the controller without specifically addressing each station. During the address count period for each station serial bits are transmitted to and received from that station by the controller for actuation and control of the energy using equipment for that station. Use of the clock line enables each station control to synchronize and therefore communicate with the controller even though the controller has an aperiodic and unpredictable response time between receiving data from and transmitting data to the station controls. Information gathered at each station control is digitized at the station control for transmission to the controller.

U.S. Pat. No. 4,163,218 describes an electronic control system which can control the operation of a number of electrical devices such as lights, outlets, sensing apparatus, etc., all of which are energized from the same power lines. Each of the electrical devices is respectively connected to the power lines by an addressable switch unit. A central control unit is connected to the power line and generates a binary coded time division multiplex signal, including an address portion and a command portion. The encoded signal is transmitted directly onto the power lines and is received by the addressed switch, which responds to the command to control the state of the electrical device, and in turn sends a status response onto the power lines which is received at the central unit.

U.S. Pat. No. 4,153,936 describes a self-contained flexible multi-purpose and multi-function energy control system capable of monitoring energy consuming loads, providing signals indicative of the state thereof and for selectively energizing and deenergizing such loads in response to a variety of preselected conditions and time frames. The system is also capable of cycling the loads and of varying the cycling pattern in accordance with preestablished conditions.

U.S. Pat. No. 4,110,825 describes a power demand control in a plant facility is improved by allowing the demand limit imposed as a target to be met at the end of a control period to follow the actual demand in the plant. The demand limit is automatically optimized as actual demand fluctuates and it is set in accordance with past history.

U.S. Pat. No. 3,872,286 describes a control of the consumption of energy derived by an industrial user from a power supply system (electrical, gas or like commodity), and more particularly to a control system for adjusting an industrial load system to limit the demand of power while respecting the constraints of the load system.

Notwithstanding the prior art, the present invention is neither taught nor rendered obvious thereby.

SUMMARY OF THE INVENTION

The present invention involves multi-utility energy control system with at least one control center computer with specialized software having a dashboard screen and a plurality of unique subscreens, and having a multi-utility real time meter device. The meter device is used for monitoring consumption of a plurality of different utility types with a single meter. This includes a main housing which contains a central processing unit, visual display meats connected to the central processing unit, programming controls, a power source connection and a plurality of meter sensor connections. The device also includes a plurality of utility meter sensors which are connected to the central processing unit of the main housing. The utility meter sensors may be retrofit sensors which are attachable to existing utility meters for sensing real time rates from the existing utility meters, and for transmitting the real time rates to the central processing unit. These meter sensors may be attachable to outside surfaces of electromechanical utility meters and may measure magnetic flux caused by motion within the electromechanical utility meters. Alternatively, the utility meter sensors may be integrally connected with meters which are designed to replace existing meters or to be installed in new applications. The sensors may be connected to the central processing unit by direct low voltage wire, by signal through AC power lines, by spread spectrum pulses or by other arrangements. The meter device converts data to computer language and transmits it to the computer central processing unit. In turn, the computer functions with appropriate software including the dashboard screen and a number of interconnected subscreens to utilize the real time consumption rate data to generate selected information, and includes functional software for monitoring and responding to monitored data, including recognition of surges, power quality and characteristics, increase in usage versus historical data, etc., and institutes appropriate corrective actions by direct link to existing utility consuming control systems on site. These links communicate from standard networks, hard copper wire or through an internet exchange, e.g., Ethernet "LAN" based network, standard copper line internet, or radio frequency-based networks. The control computer with its customized software is connected to various utility consuming control systems such as, backup generators powered by alternative fuels, HVAC systems, elevators, refrigeration systems, machinery, fuel consuming equipment, etc. and is connected to both diagnostic and control features of these individual systems. The program of the control computer formats pertinent systems energy data, stores it, retrieves it, diagnoses it and acts in response to changes identified and preprogrammed needs. The program reduces consumption without shutting down vital equipment by identifying and warning of individual utility consuming equipment and consumption rate changes, by anticipating peak loads, and by anticipating demand spikes and sags, and then initiating a control protocol and algorithm to the appropriate control system to automatically correct or eliminate inefficient energy consumption. In addition, the control computer may provide access via a controlled network, the internet or a standard direct line to alternate providers of various utilities such as electricity, steam, gas and other consumable fuels and utility materials. The system is formatted to purchase these resources in a real time environment.

BRIEF DESCRIPTION OF THE DRAWINGS

The present invention should be more fully understood when the specification herein is taken in conjunction with the drawings appended hereto wherein:

FIGS. 5 through 25 illustrate subscreens utilized therewith.

DETAILED DESCRIPTION OF THE PRESENT INVENTION

Figure 1:
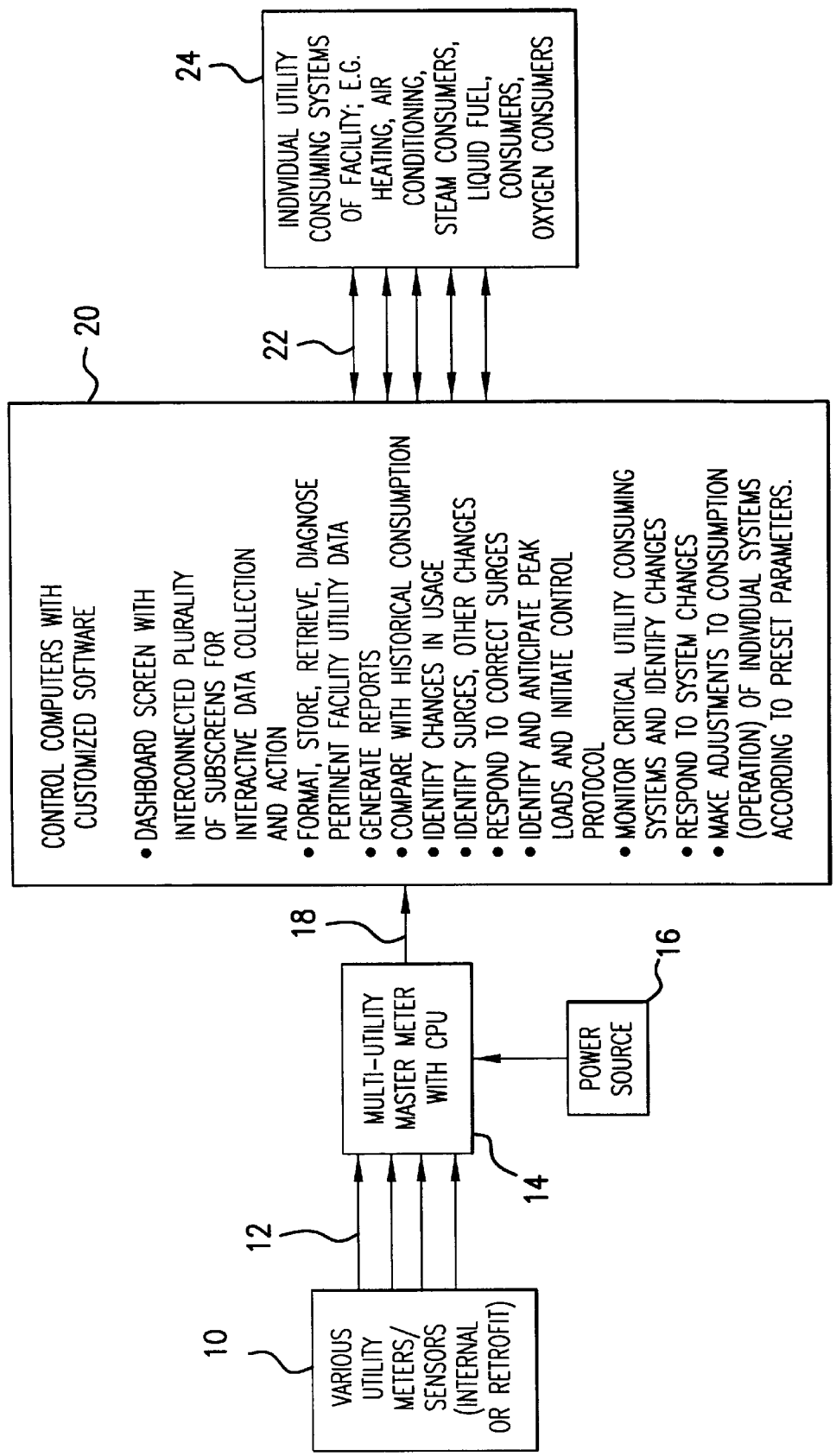
FIG. 1 illustrates a schematic diagram of one embodiment of the multi-utility energy control system of the present invention.

The multi-utility real time energy control system of the present invention includes a multi-utility meter and plurality of individual meter sensors for real time sensing of a multitude of utility consumption rates, as well as a central control computer and appropriate software. The word "utility", as meant herein, should be construed to mean any energy or power related function which is purchased from a source separate from the user and is consumable to operate machines and devices. Thus, included in this term are electric utilities, gas utilities, steam utilities, oil utilities, gasoline utilities, diesel utilities, propane utilities, oxygen utilities and other types of gas and liquid utilities which are flowable and consumption may be measured by meters.

The present invention system includes a plurality of sensors for a multitude of utility meters and these sensors may be retrofitted through existing electromechanical meters or retrofitted to other types of meters such as electric or digital display meters or even float type meters. Alternatively, the present invention control system sensors may involve meter replacement with built-in sensors. In the case of retrofitting to existing electromechanical meter, the present invention device sensors may rely upon any known method of reading and sending signals from existing meters without exceeding the scope of the present invention. In some preferred embodiments these sensors rely upon magnetic flux.

Other sensors may be retrofitted to electric meters which may or may not include digital display and these sensors may be wired directly to pre-existing meters.

The present invention system utility meter sensors may be electromechanical, current transformers, electrical, electronic pulse based and may be single input or multiple input sensors. The present invention utility meter sensors, in some preferred embodiments include sensors which are current transformers which transmit about 0 to about 5 milliamps to measure electricity characteristics.

The sensors used in the present invention may be connected directly to the central processing unit of the multi-utility master meter housing or may be connected indirectly. Where direct wiring may be too expensive or too difficult or in cases of large facilities, where the meters are located sufficiently separate from one another, indirect connection may be achieved through the use of "existing in-house" AC lines (wiring) using existing technology which requires a plug-in diversion device which sends signals along existing AC lines at different frequencies or modulation and these may be received at the master meter through the power source itself, for example. U.S. Pat. No. 4,783,748 entitled "Method and Apparatus for Remote Measurement" and assigned to Quadlogic Controls Corporation describes such a system for long distance transmission and would be used in the present invention to connect meter sensors to the central processing unit of the master meter of the present invention device. U.S. Pat. No. 4,783,748 is incorporated by reference in its entirety.

The multi-utility master meter includes central processing unit contained therein which is adapted to receive data from a plurality of sensors and may have, for example, six, eight, twelve or even more such as tens of receiving connections for as many meters as may be desired to be read for a large facility containing a plurality of storage tanks with their own meters, the central processing unit could, for example, be programmed to sequence as many as 100 meters or even more. The master meter central processing unit includes a programming control panel which would be uniquely adapted to satisfy programming requirements. Typically, this could be a panel such as is currently used on security control panels, sophisticated timers, swimming pool pumps and the like. The central processing unit will permit the user to specify the number of meters to be utilized and will then permit the user to program each meter in, for example, numerical sequence by selecting the type of meter (utility type) being sensed. The user will then select from a menu the appropriate rate base for each meter. These rate bases will be directly correlated to the individual utility meter itself, such as cubic feet per hour, kilowatts per hour, gallons per hour, liters per minute, kiloliters per minute, etc. Optionally, there may either be an abbreviation or utility menu which can be correlated to that particular programmed sensor or an alpha based keyboard may permit the user to type in or abbreviate whatever work or phrase the user may desire, e.g. the type of utility the supplier of the utility, or even some encrypted abbreviation. The master meter central processing unit will then permit the user to select a time basis for each meter being read in addition to the instant real time readings, such as minute, hour, day, week, month, year or any arbitrary portion of any of these and/or readings based on yet indeterminate time periods such as from the time the meter starts moving to the time the meter stops moving. The master meter central processing unit will then permit the user to select read-outs of any of the foregoing for each of the utility meters being read. The user will repeat the previous programming steps for each utility meter being read or some other logical sequence as may be desired. The master meter central processing unit will interpret through consumption and demand of liquids and gasses, electromechanical pulses and electricity through current transformers. The master unit software system will integrate a variety of inputs with selective outputs.

The master meter central processing unit will recognize the sequence, organize the real time data for each sequences and store it and will also, while retaining the real time data, convert that date on the time basis selected by the user. The master meter central processing unit will also convert the data to an appropriate computer language for output to one or more computers. This central processing unit may replace data at a preprogrammed sequence, such as monthly or otherwise or may retain data for a certain moving time frame and constantly drop off the oldest data as new data is received. Alternatively, the master meter central processing unit may offer to the user, the opportunity to program how much data, that is for how long a period, data is retained.

The master meter central processing unit of the present invention system is connected to at least one visual display unit such as a screen or an LCD located on the master meter and may automatically present data on a cycled basis in sequence or simply present an entire sequence on call when the user inputs a command for this purpose or only selected data as the user may desire. The master meter central processing unit may output data by conversion to a preprogrammed format such as DOS, Windows, Java or any other operating system language for input to the control computer of the present invention system. The master CPU will also engage in least cost routing of utility costs to search out in real time the generation costs of utility to allow the end user to purchase power cost effectively.

Thus, in the present invention system, the multi-utility master meter will serve three distinct useful functions. First, it may provide a single location read-out for all utility consumption for a particular site; second, it will provide converted data as a user may desire; and, third, it will provide the user the opportunity to input information into one or more control computers for subsequent control of utilities. This third function will enable the user with the control computer(s) to identify sudden surges, losses, equipment stoppage, etc. It will also enable the user to control and regulate specific consumption and even operate budgets, perform projections and seek competitive utility contracts.

The present invention software provides for a dashboard screen which acts as a master control screen on the control central computer or computers, as well as a plurality of utility subscreens relating thereto. The dashboard screen presents a plurality of utility type icons for selection of a utility therefrom and also provides an interface gateway for selection of other utility related data. The utility type icons of the dashboard screen may include icons for electric, oil, gas, water and steam. It may also include other energy or utility types. The interface gateway may include one or more selection indicia, e.g., icons which may have one or more choices selected from facility layout, fire and sprinklers, security, backup generation, power quality, demand center, HVAC, lighting and electrical. Both the utility type icons and the interface gateway offer the user the opportunity to select one of either so as to provide more detail for that energy. When a selection is made, subscreens appear which provide real time information such as daily, weekly, monthly and yearly kilowatt consumption for the electricity selection and other pertinent facility data. Additional subscreens will appear and offer the opportunity for on-line purchase of utilities to the user.

When a demand center choice is made from the interface gateway of the dashboard screen, various selections are offered with much greater detail on a building by building, floor by floor and even room by room basis, with appropriate subscreens, for the particular location selected.

Additionally, the software may also provide screens and subscreens for consolidated multi-site management. Thus, the user may start with a screen which will display a map of an entire energy net, permitting the user to select regions, states, districts and specific sites, sequentially by further detailed screens. Once the actual site is on screen, the user may then utilize the main dashboard screen for that site.

FIG. 1 illustrates a schematic diagram of one embodiment of the multi-utility energy control system of the present invention. Various utility meter with internal or retrofitted sensors 10 are sensed by connection 12 to multi-utility master meter 14. This is described in more detail in conjunction with the figures below. Master meter 14 is driven by power source 16 and provides consumption rate data in a computer readable format to one or more control computer(s) 20 such as via connection 18. Control computer(s) 20 has customized software, the functions of which are illustrated in block 20 of FIG. 1. The control computer(s) 20 is connected via various connections such as connection 22, to individual utility consuming systems 24. In this manner, the functions set forth in block 20 may be performed.

Figure 2:
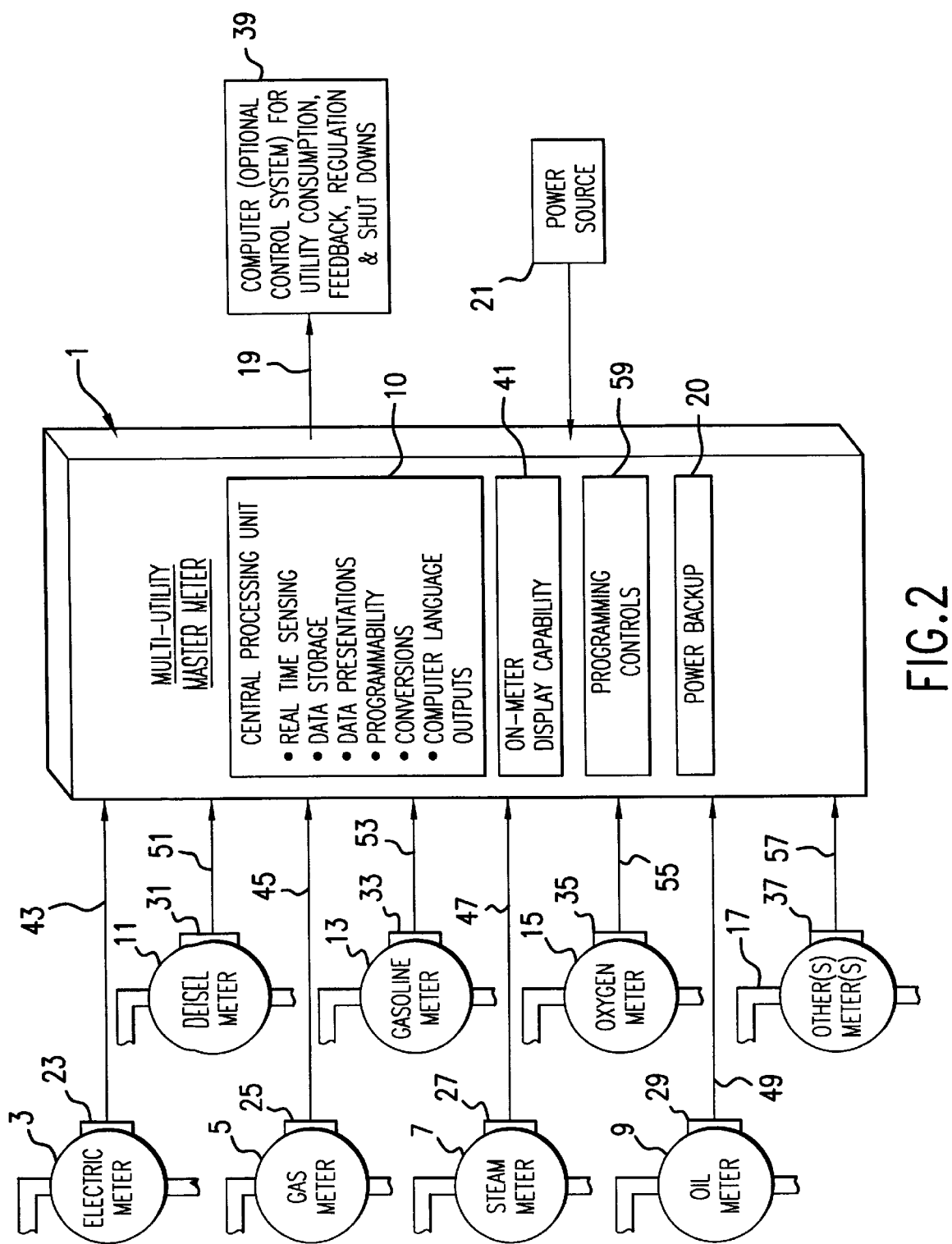
FIG. 2 illustrates a schematic diagram of a multi-utility real time meter device of one embodiment of the present invention multi-utility energy control system; and, FIG. 3 shows a schematic block diagram of the steps and functions of a meter device used in the present invention such as shown in FIG. 2; and, FIG. 4 illustrates a dashboard screen used in the preferred embodiments of the present invention software.
Figure 3:
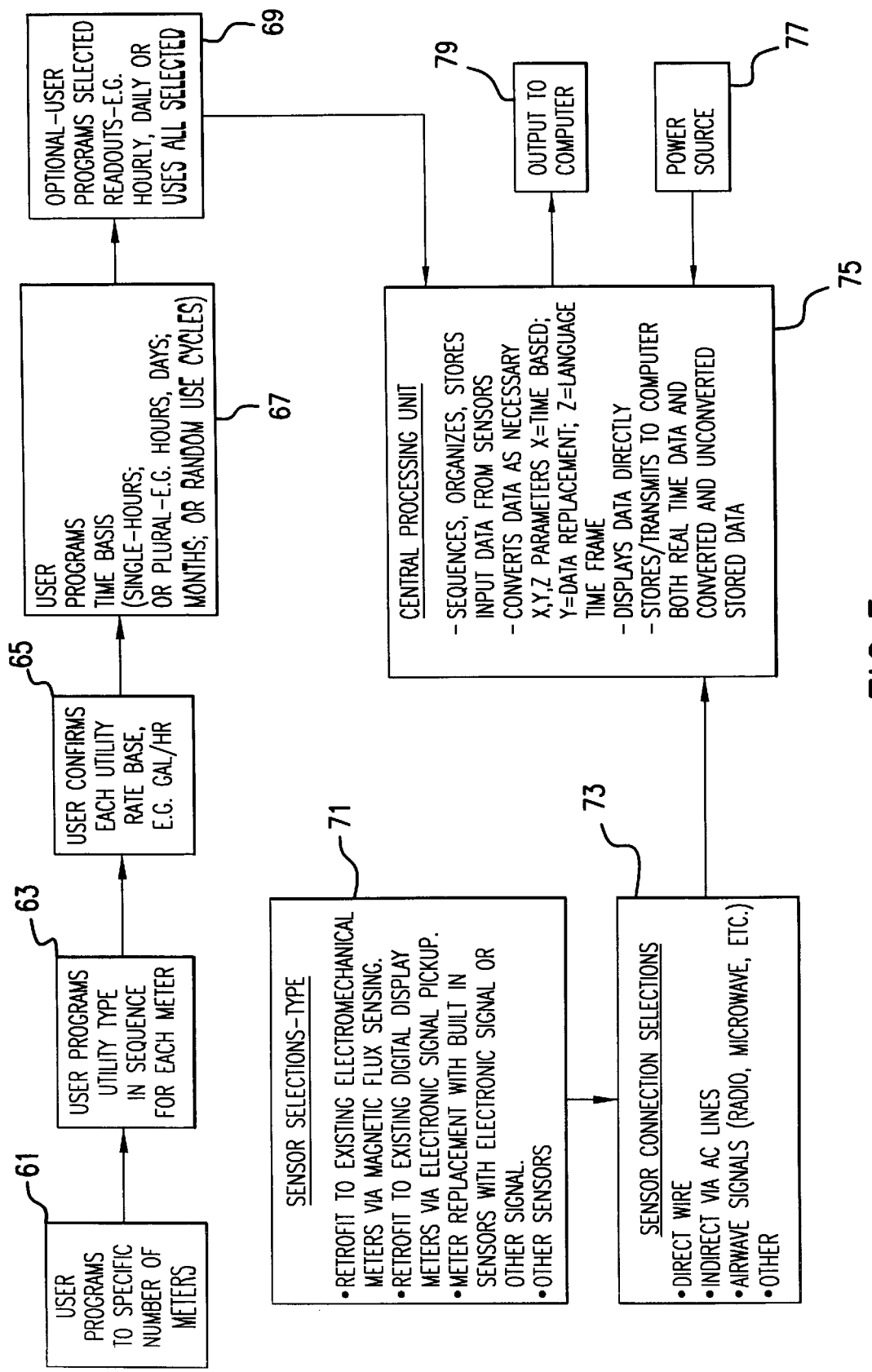

FIG. 2 shows a schematic diagram of a multi-utility real time meter device used in a multi-utility energy control system of the present invention, including a multi-utility master meter 1. Various utility meters are shown in FIG. 3 and are merely examples of possible applications for the present invention device. These include electric meter 3, gas meter 5, steam meter 7, oil meter 9, diesel fuel meter 11, gasoline meter 13, oxygen meter 15 and symbolic meter 17 for one or more other utility meters. Connected there to are sensors 23, 25, 27, 29, 31, 33, 35 and 37, respectively. Each is connected to master meter 1 via connection 43, 45, 47, 49, 51, 53, 55 and 57, respectively. The sensors such as sensor 23 may be any of the types discussed above or as described in conjunction with the figures below. Likewise, connection 43 may be by any connection described in more detail in conjunction with the figures below. Master meter 1 is powered by power source 21 and this may be conventionally alternating current power so that master meter 1 may have a standard plug for power via conventional outlets. Other power arrangements may be utilized without exceeding the scope of the present invention.

As indicated in FIG. 2, master meter 1 includes a central processing unit 10 which is receptive to real time sensing, has programmability and capabilities for data storage, conversions, data presentation and computer language outputs. It is programmable and master meter 1 includes a visual display presentation 41 as well as programming controls 59. Optional, but preferred power backup 20 is also included.

Master meter 1 via connection 19 presents recognizable outputs to computer 39 for subsequent storage, retrieval and other computer functions including control utility consumption, feedback, regulation, shutdowns, economic tracking and reporting functions.

Referring to FIG. 3, there is shown a block diagram illustrating specific steps involved in the programming and functioning of one embodiment of a present invention system master meter such as master meter 1 of FIG. 2. In block 61, the user programs central processing unit 75 to specify the number of meters to be read. In block 63, the user programs central processing unit 75 for utility type, in sequence, for each meter. In block 65, the user confirms or selects each utility rate base for each meter, e.g. gallons per hour. In block 67, the user programs central processing unit 75 for time basis (single or plural outputs for each meter e.g. hours, days, months or random use cycles). In optional block 69, the user programs central processing unit 75 for selected readouts, e.g. hourly, daily or uses readouts of all previously selected time bases. Block 77 is the power source which powers central processing unit 75 (and the sensors in many embodiments). Block 79 is the output to one or more computers from central processing unit 75.

Block 71 indicates sensor type selection. These sensors may generally be of any sensor type that will extract rates from meters and send such data to central processing unit 75. Although not limited to these selections, block 75 includes: retrofit to existing electromechanical meters via magnetic flux sensing; retrofit to existing digital display meters via electronic signal pickup; and, meter replacement with built in sensors with electronic signal or other signal. Block 73 shows sensor connection choices including direct wire, indirect wire via AC lines, airwave signals and any other possible connection methods which may be available, e.g. lightwave.

Central processing unit block 75 indicates that the central processing unit provides sequences, organizes, stores input data from sensors; converts data as necessary X, Y, Z parameters, X=time based, Y=data replacement time frame, and Z=language; displays data directly; and, stores/transmits to computer both real time data and converted and unconverted stored data.

The control computer customized software described above will function to perform the desired operations as set forth in the figures and in the above Detailed Description. However, an expanded version which cannot be excluded from the present invention would include more detailed feedback, analysis and activity relating to electrically consuming systems. U.S. patent application Ser. No. 08/907, 205, entitled "Commercial Customer Software Module for Utility Company Management Computer Systems" designated as Attorney Docket No. PWB-110A, filed on Aug. 6, 1997 (currently pending) and incorporated herein in its entirety by reference, describes commercial customer software which may be used in conjunction with the present invention control computer(s). For example, the discussions with respect to FIGS. 4, 5, and 6 of that patent application describe sufficient detailed software activity for incorporation into the present invention control computer(s). The only difference between this cited reference and the present invention with respect to the computer software, is that the controls in the cited reference are located at the power utility company and not at the actual facility on site, and the cited reference does not rely upon the sensors and multi-utility master meter included in the present invention.

Additionally, the present invention system has as one of its primary objectives the ability to provide the user with choices in purchasing power and other utilities to obtain the most cost effective purchases. In some embodiments, the present invention may be linked to multiple providers to give the user direct instant contracting capabilities, while other systems of the present invention may include an intermediate utility broker and even the ability to bid for utility services.

Figure 4:
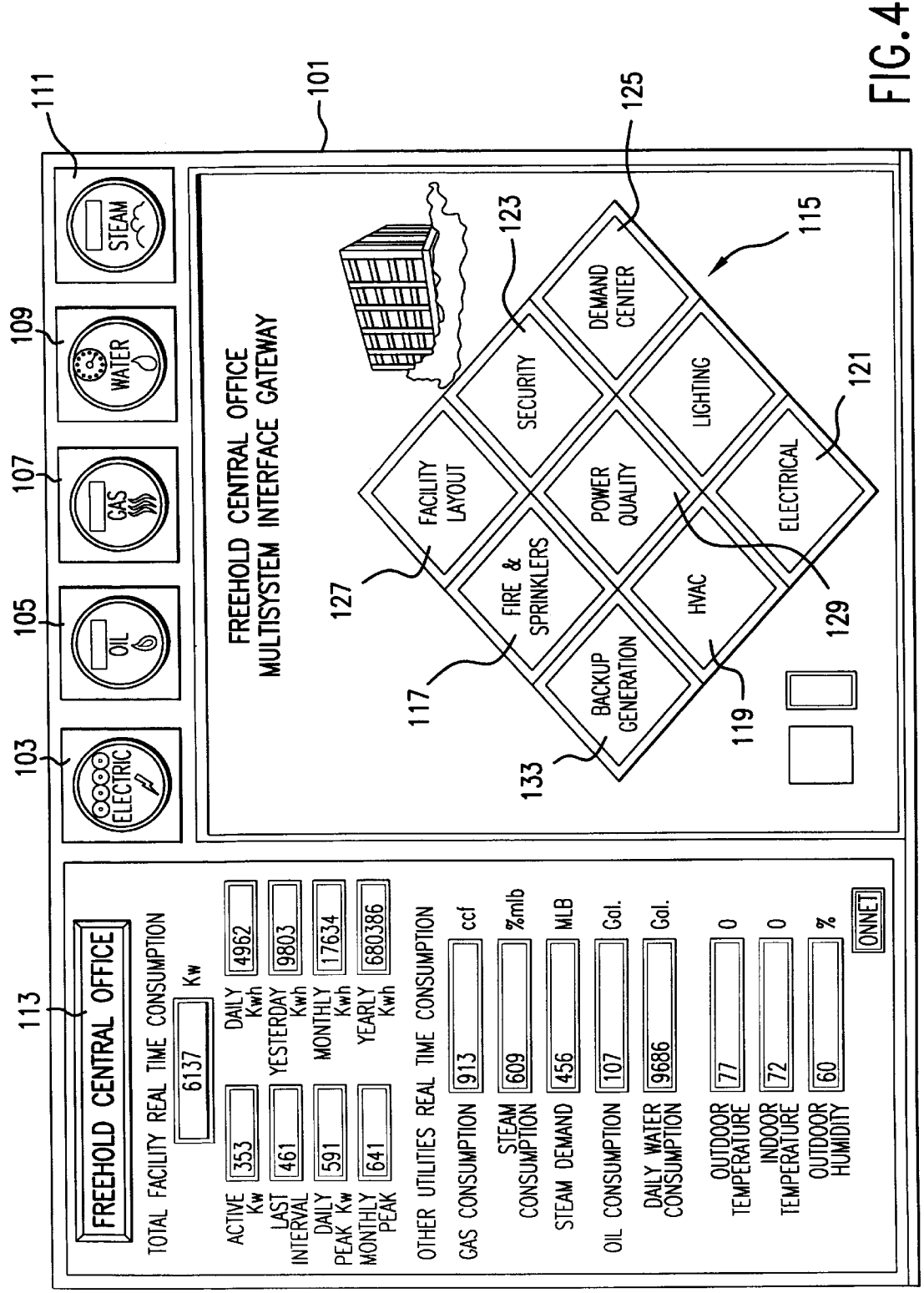

FIG. 4 illustrates a dashboard screen 101 which may operate as a main control screen. It includes a plurality of utility icons including icons 103, 105, 107, 109 and 111 for electric, oil, gas, water and steam, respectively. There is also a real time consumption chart 113 which illustrates various utility information for the facility being reviewed. Finally, there is a multi system interface gateway 115 which includes utility related selections such as fire and sprinklers 117, HVAC 119, electrical 121 and security 123. Demand center choice 125 is also illustrated, these screens are integrable modules which will be discussed in more detail in conjunction with FIG. 16 and sequential Figures, below.

Figure 5:
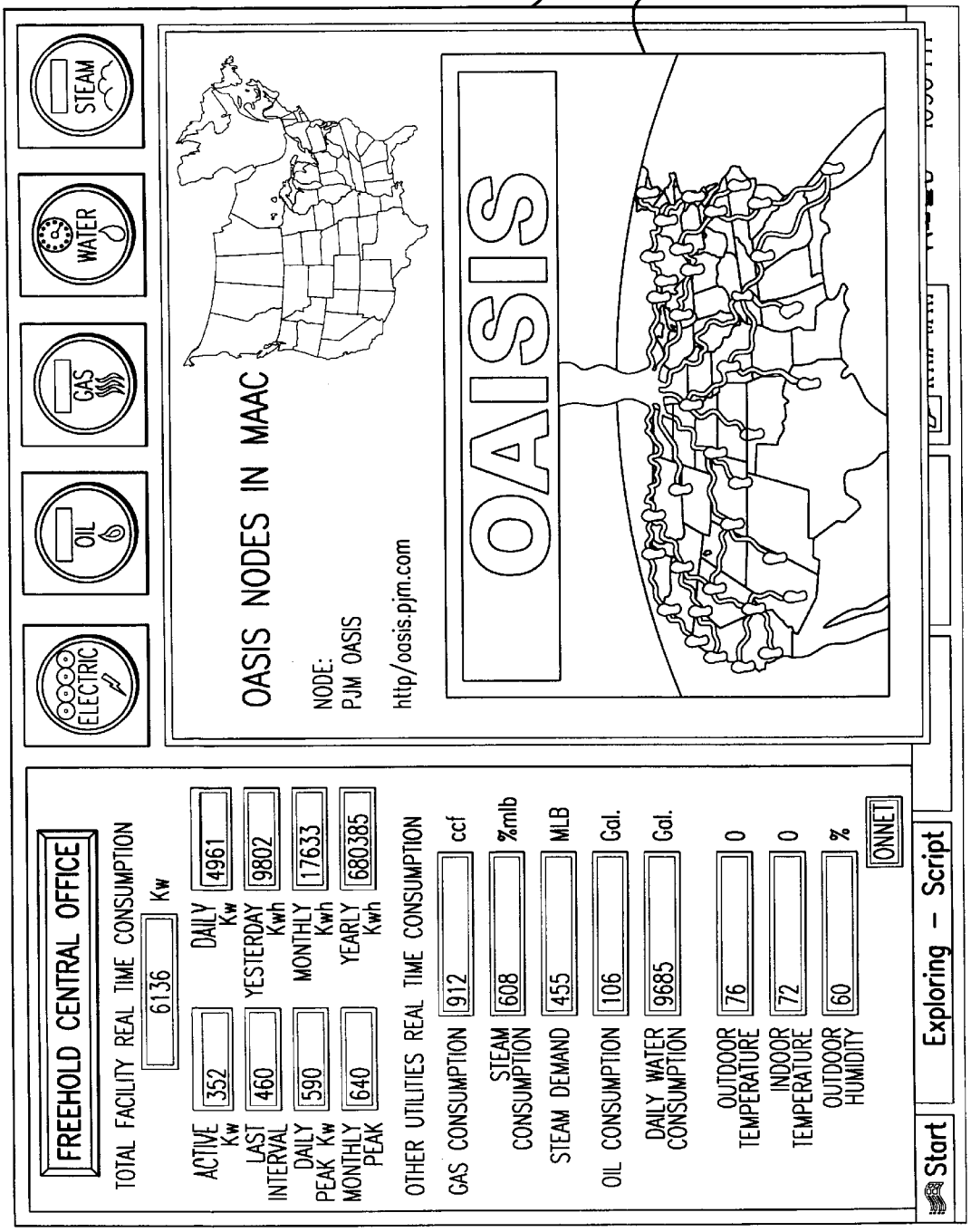
Figure 6:
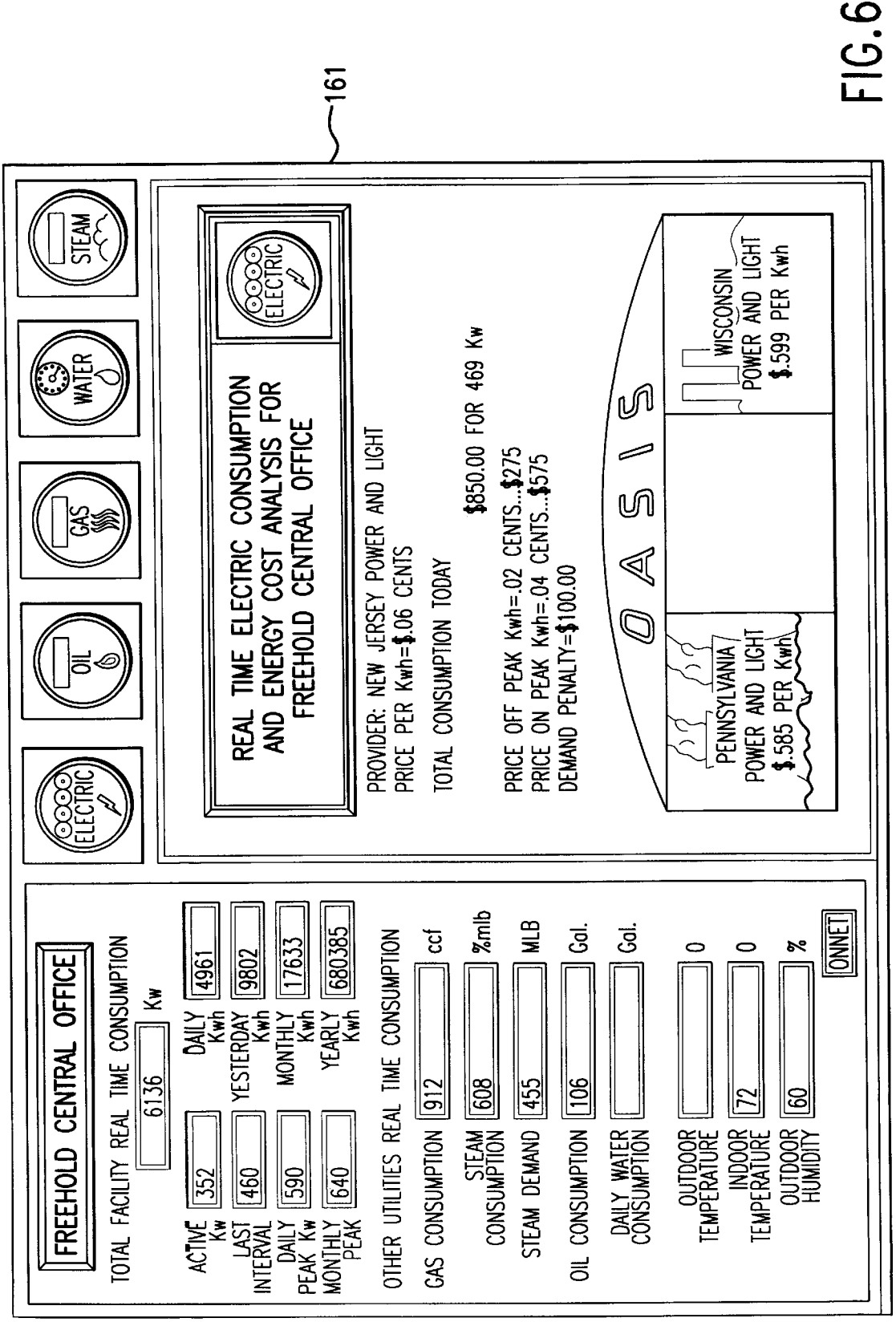
Figure 7:
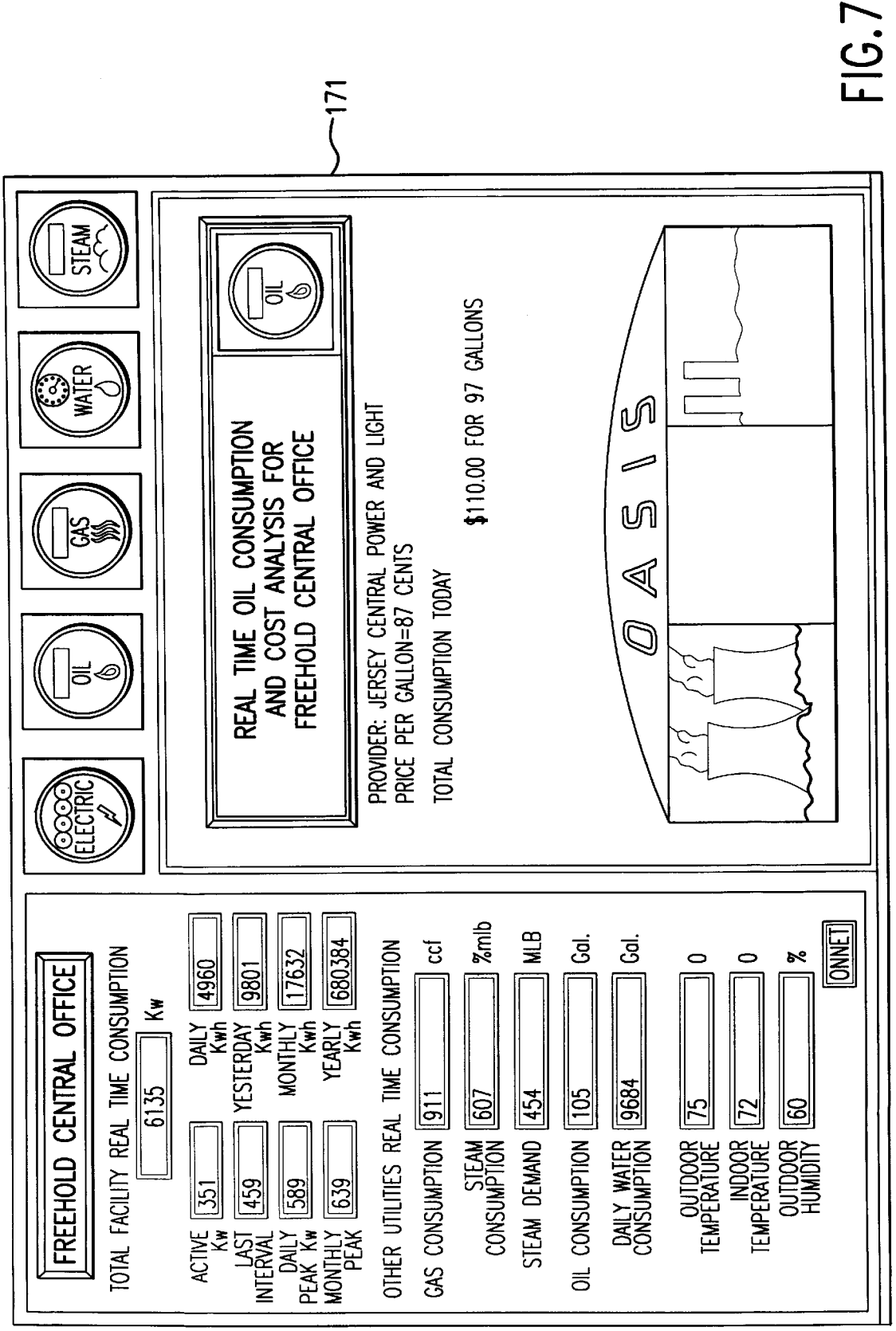
Figure 8:
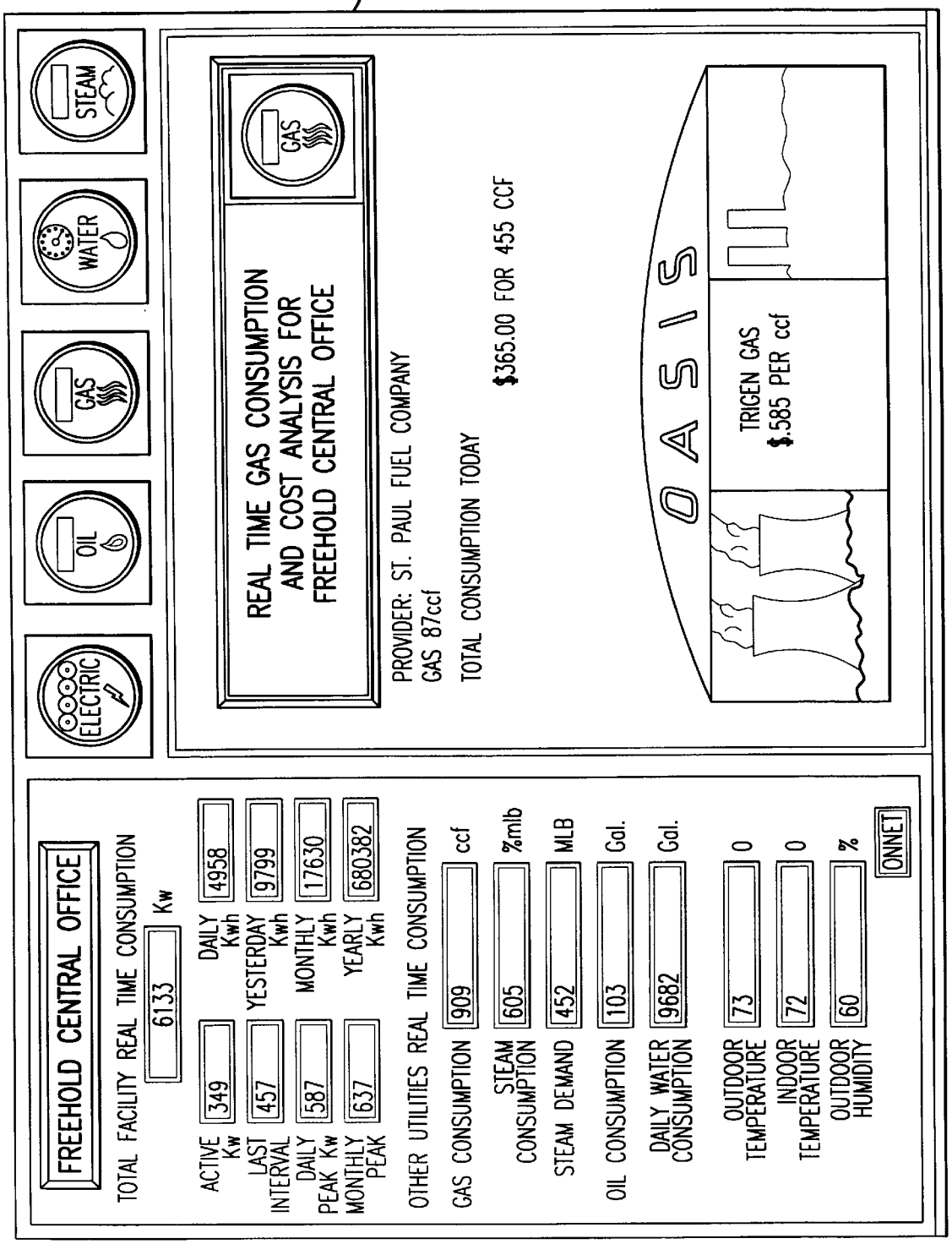
Figure 9:
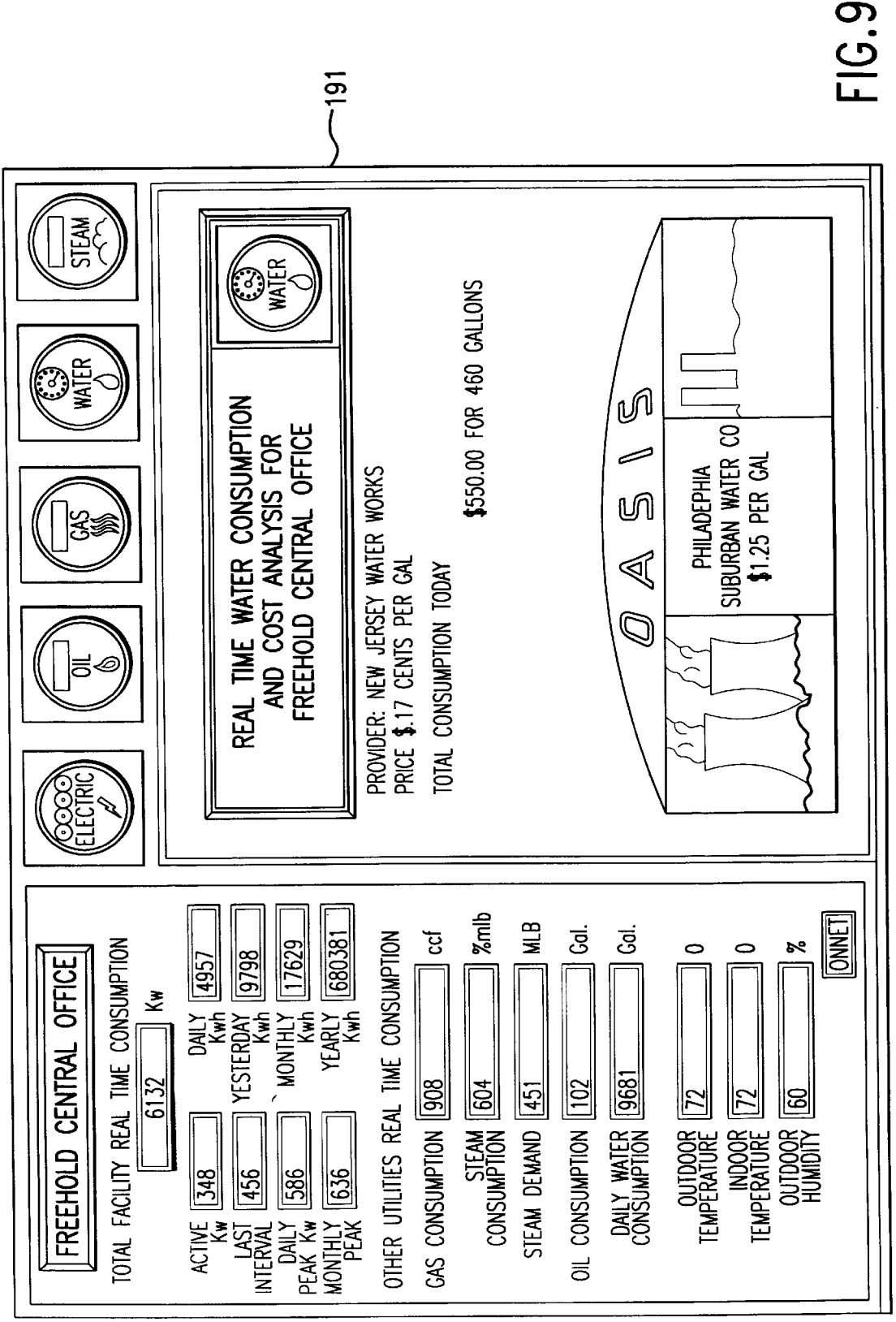
Figure 10:
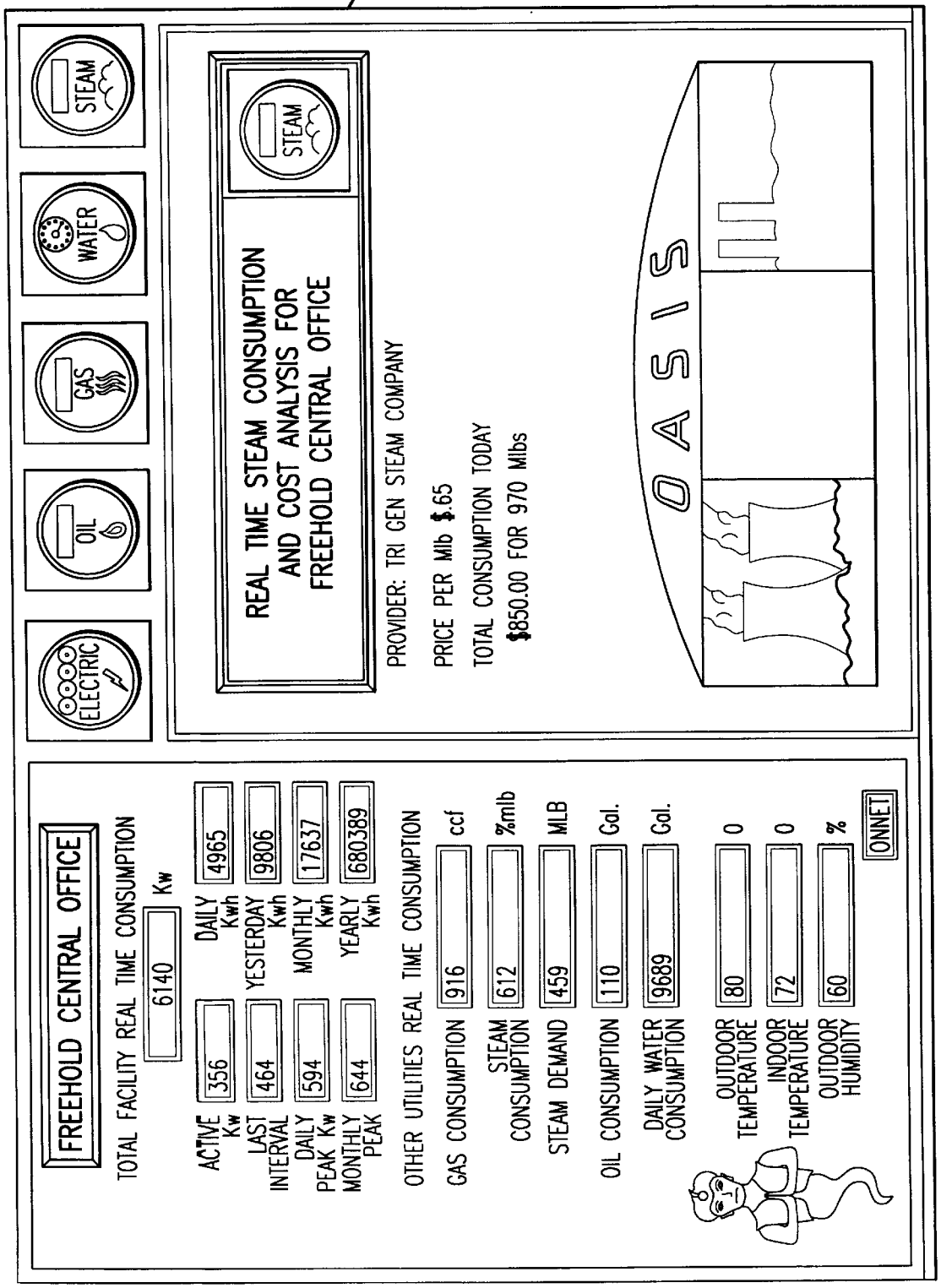

If the electric icon 103 is selected in FIG. 4, an on-line electricity purchasing subprogram represented by oasis shown in FIG. 5, screen 151 as window 153 will appear. This will generate screen 161 shown in FIG. 6 which will provide electricity procurement information from alternative providers. Likewise, if the oil icon is selected, procurement information such as that shown on screen 171 in FIG. 7 will be provided. Similarly, gas, water and steam alternative procurement information will be provided as shown on screens 181, 191 and 201 in FIGS. 8, 9 and 10, respectively, when the corresponding icons are selected.

Figure 11:
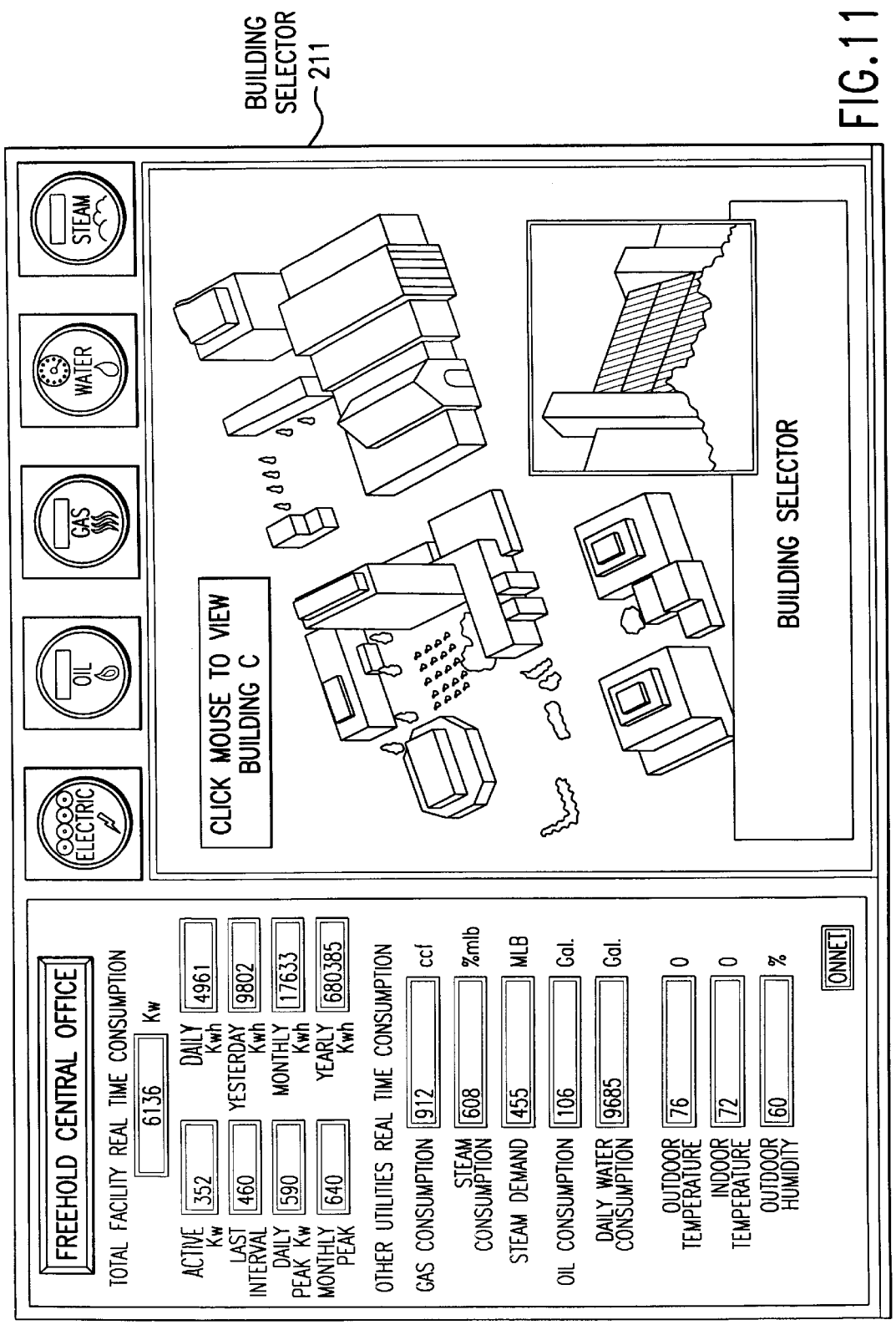
Figure 12:
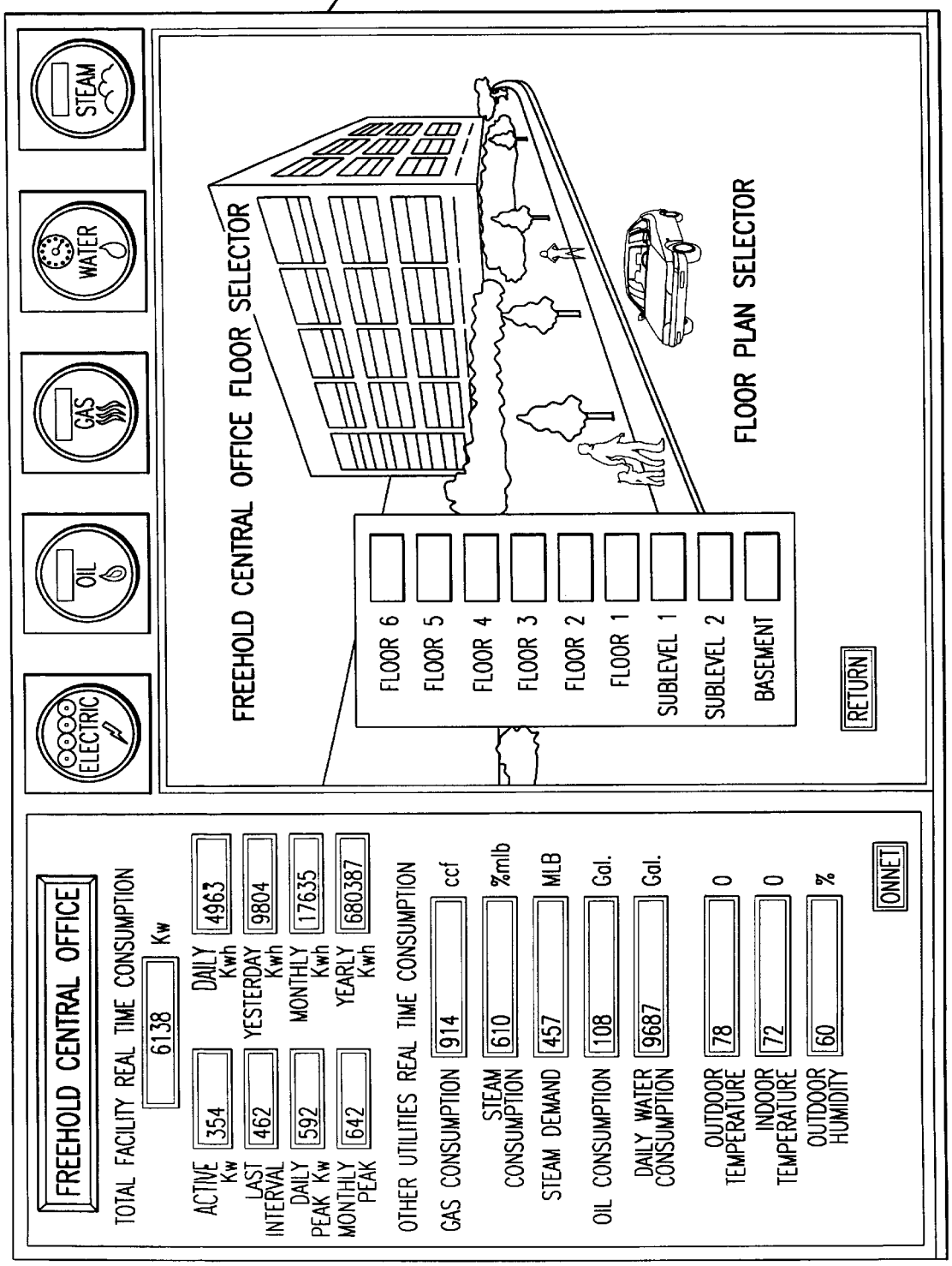
Figure 13:
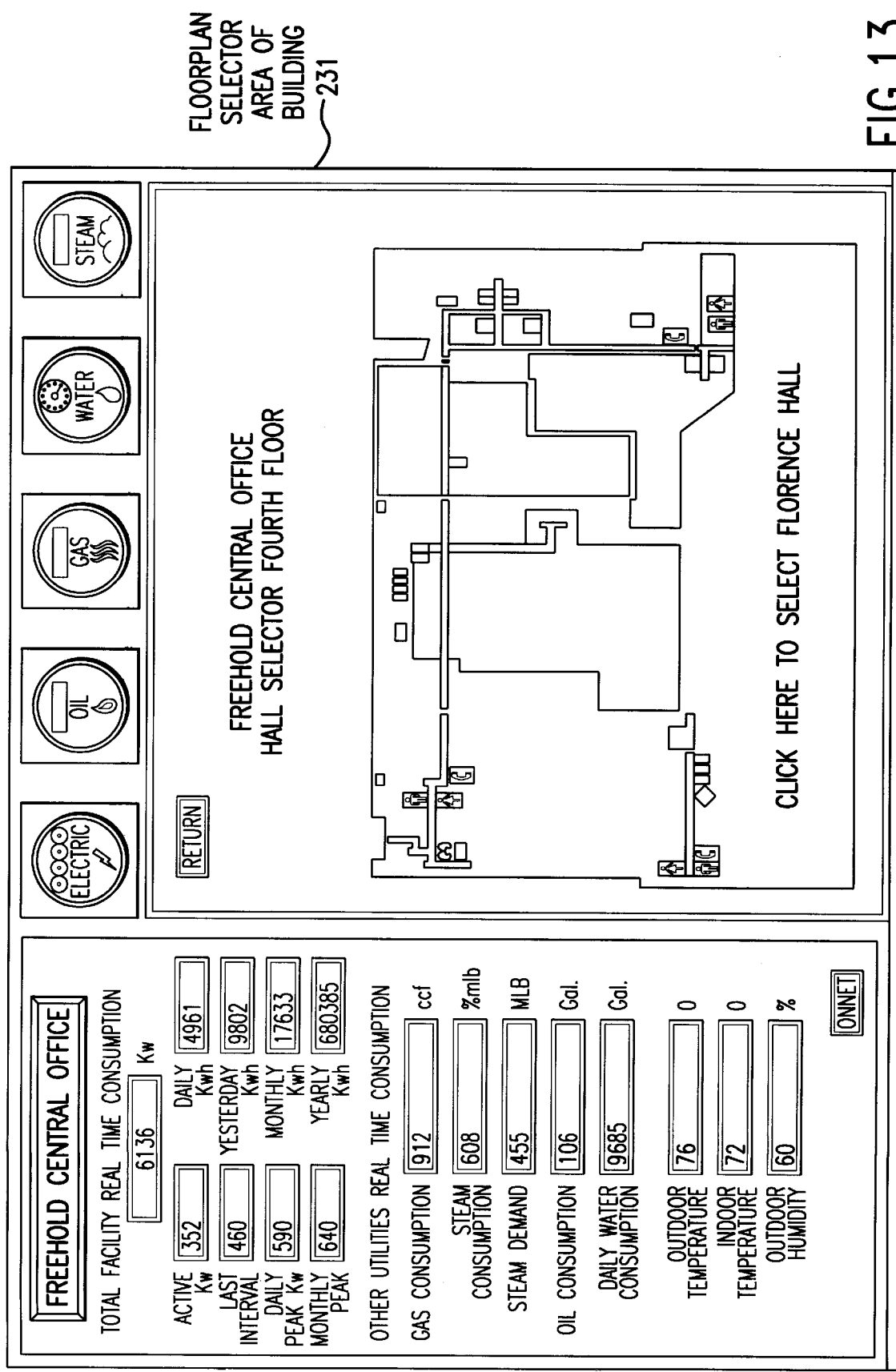
Figure 14:
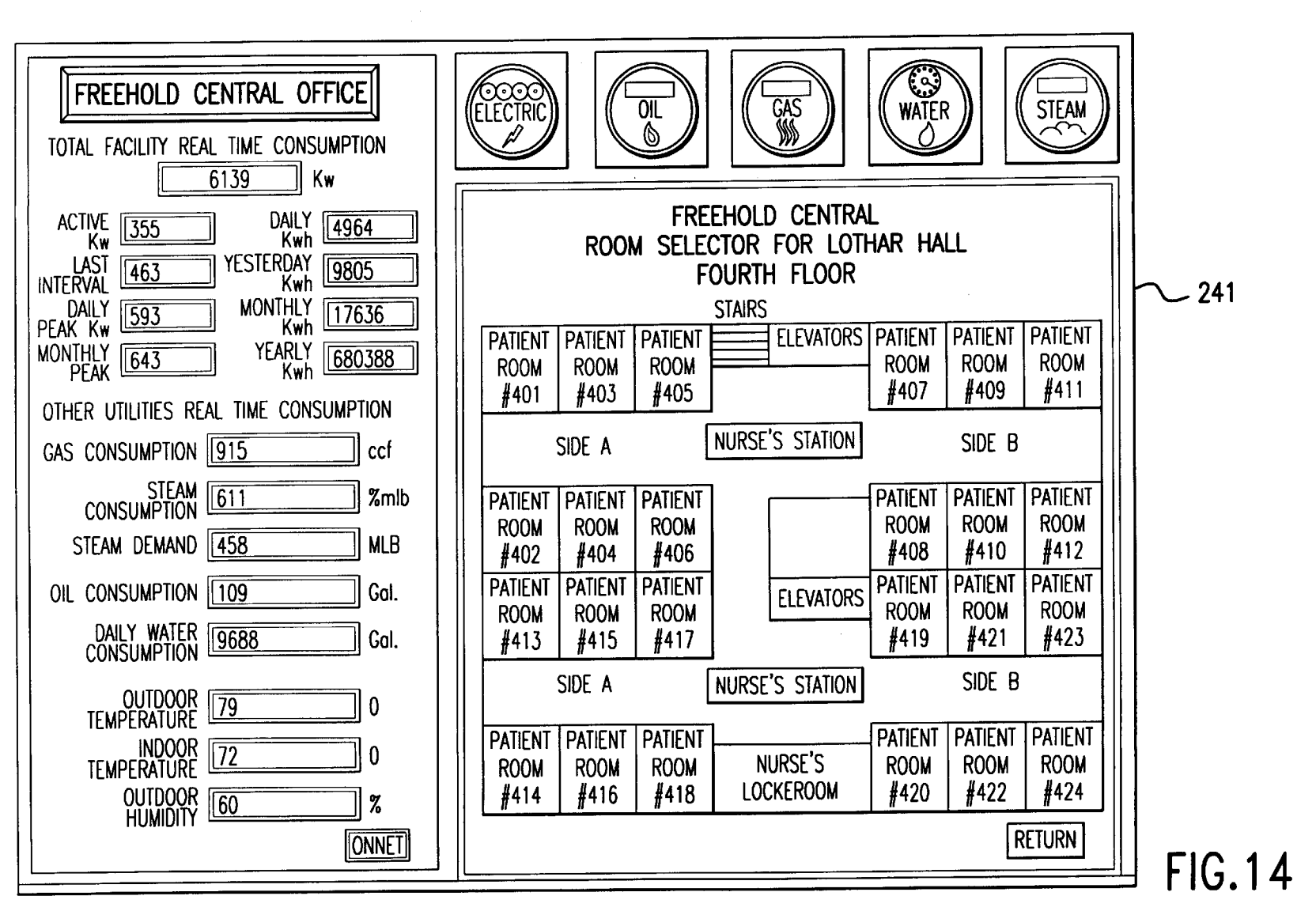
Figure 15:
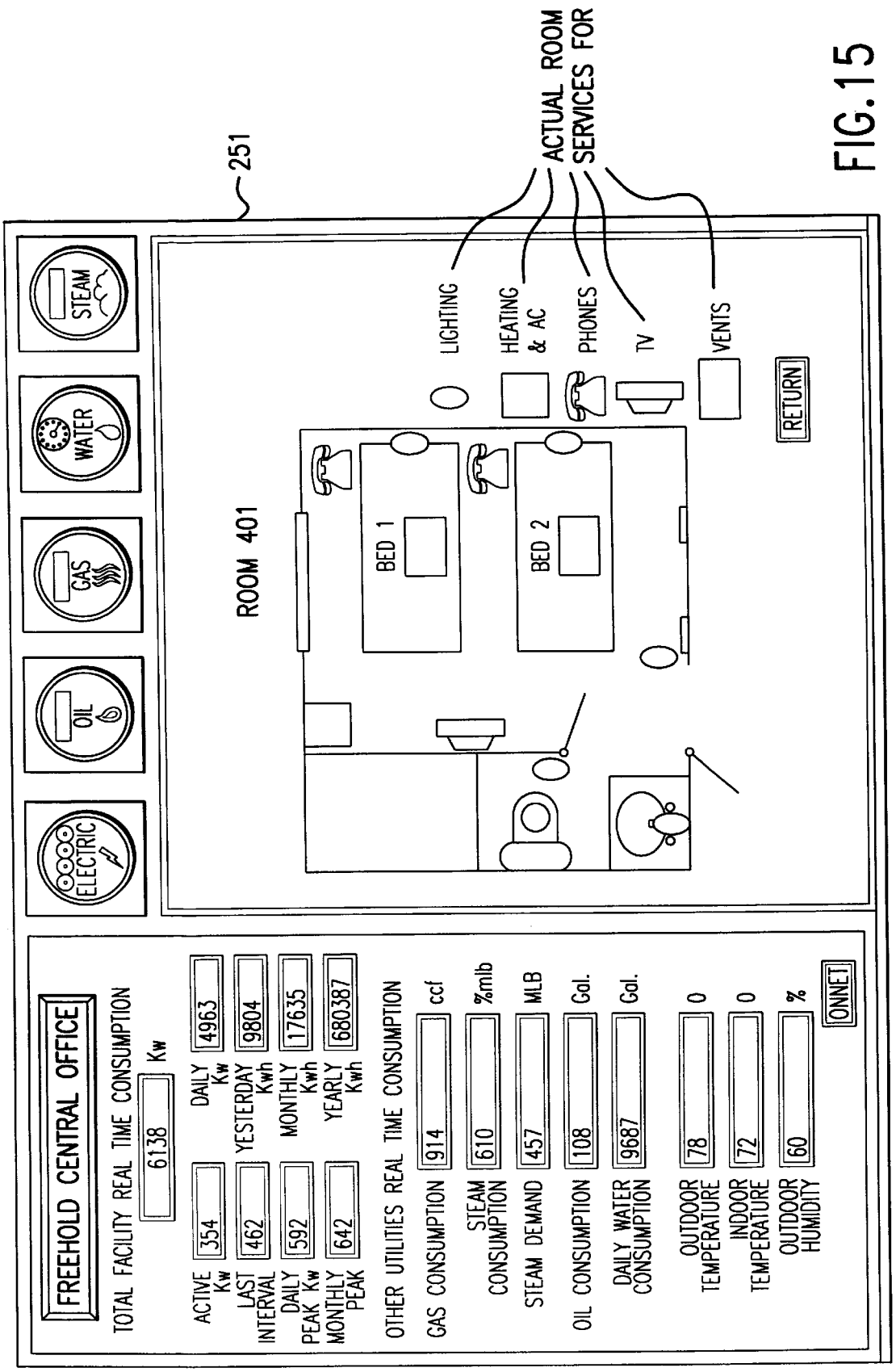

Referring again to FIG. 4, if the facility layout indicia 127 is selected from the gateway, screen 211 shown in FIG. 11 will appear and by either mouse clicking or icon selections, further and further close ups will be obtained. Thus, FIGS. 12, 13, 14 and 15 illustrate this with screen 221 of FIG. 12 offering a floor plan selector, screen 231 of FIG. 13 offering a hall selector from a particular floor, screen 241 of FIG. 14 showing a particular floor layout and screen 251 of FIG. 15 showing an actual room layout with utility indicators.

Figure 16:
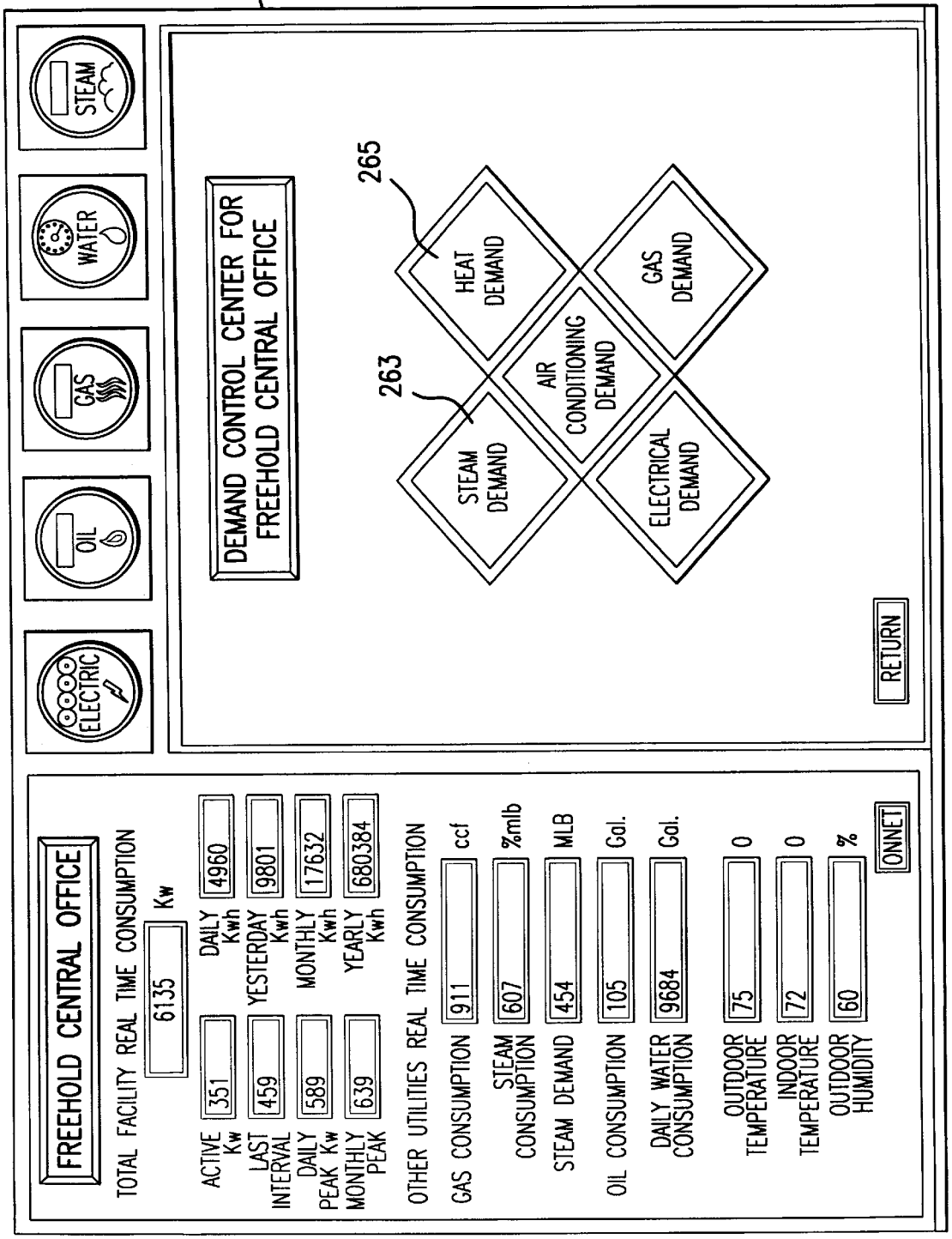
Figure 17:
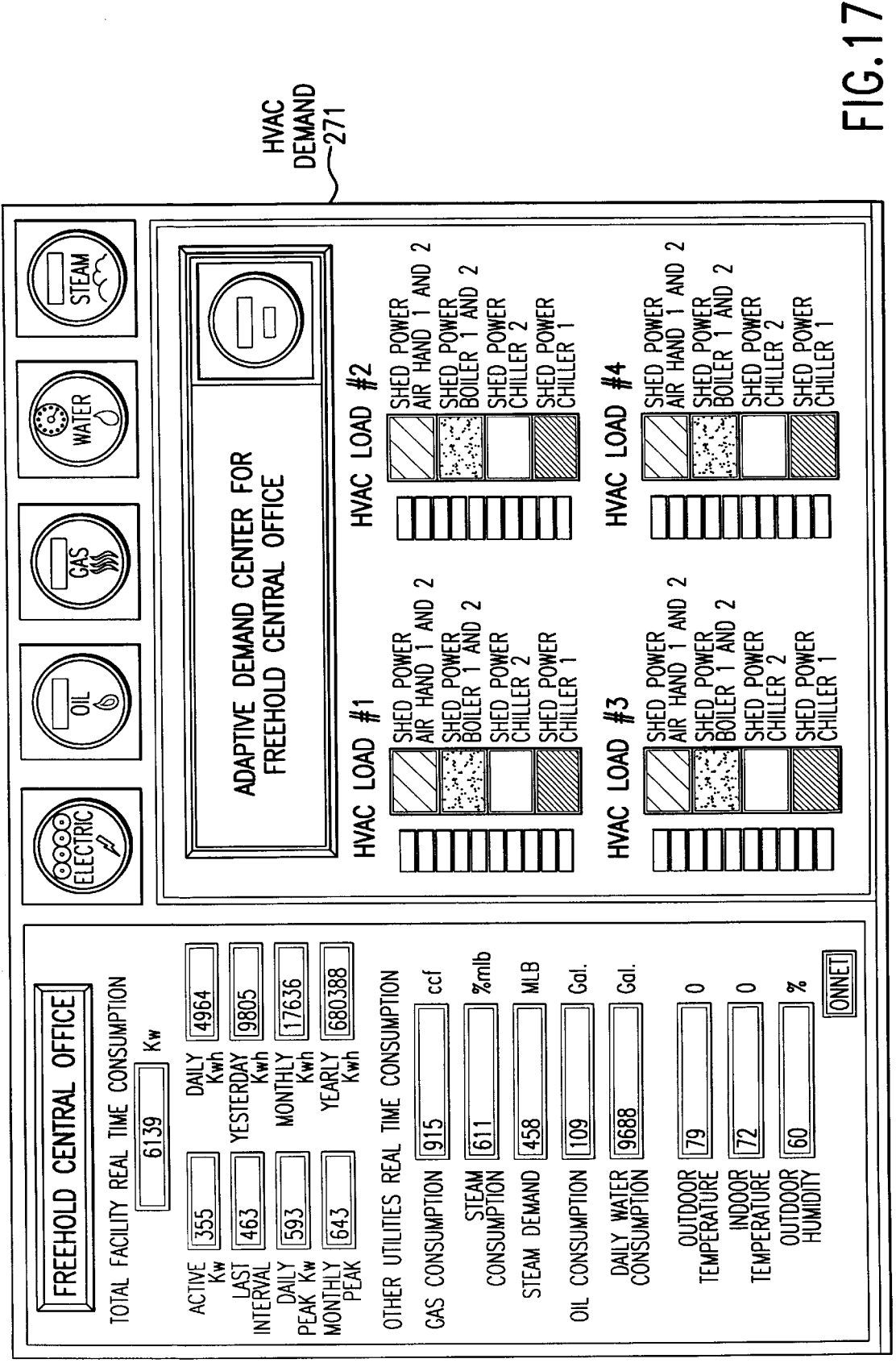
Figure 18:
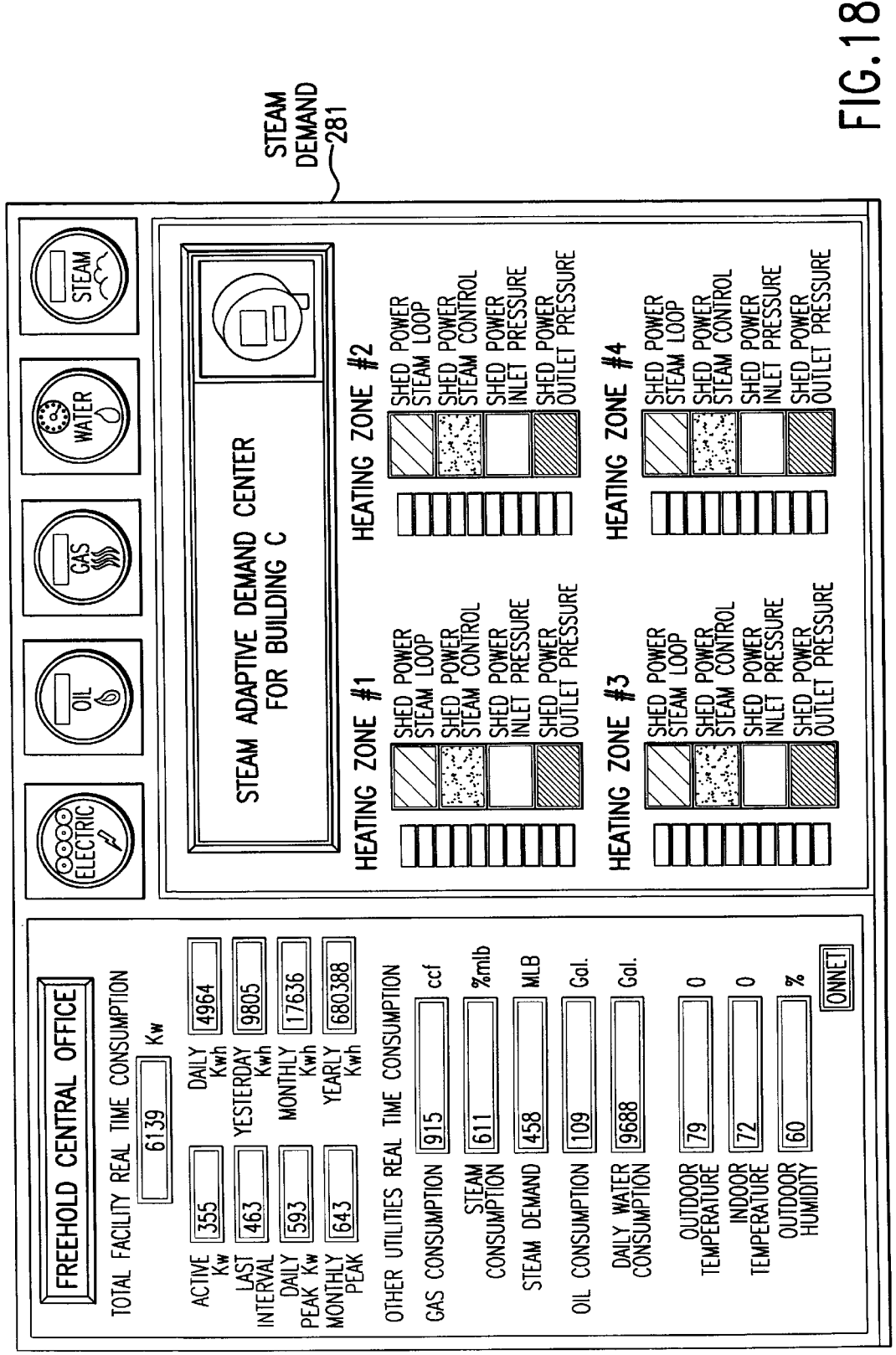
Figure 20:
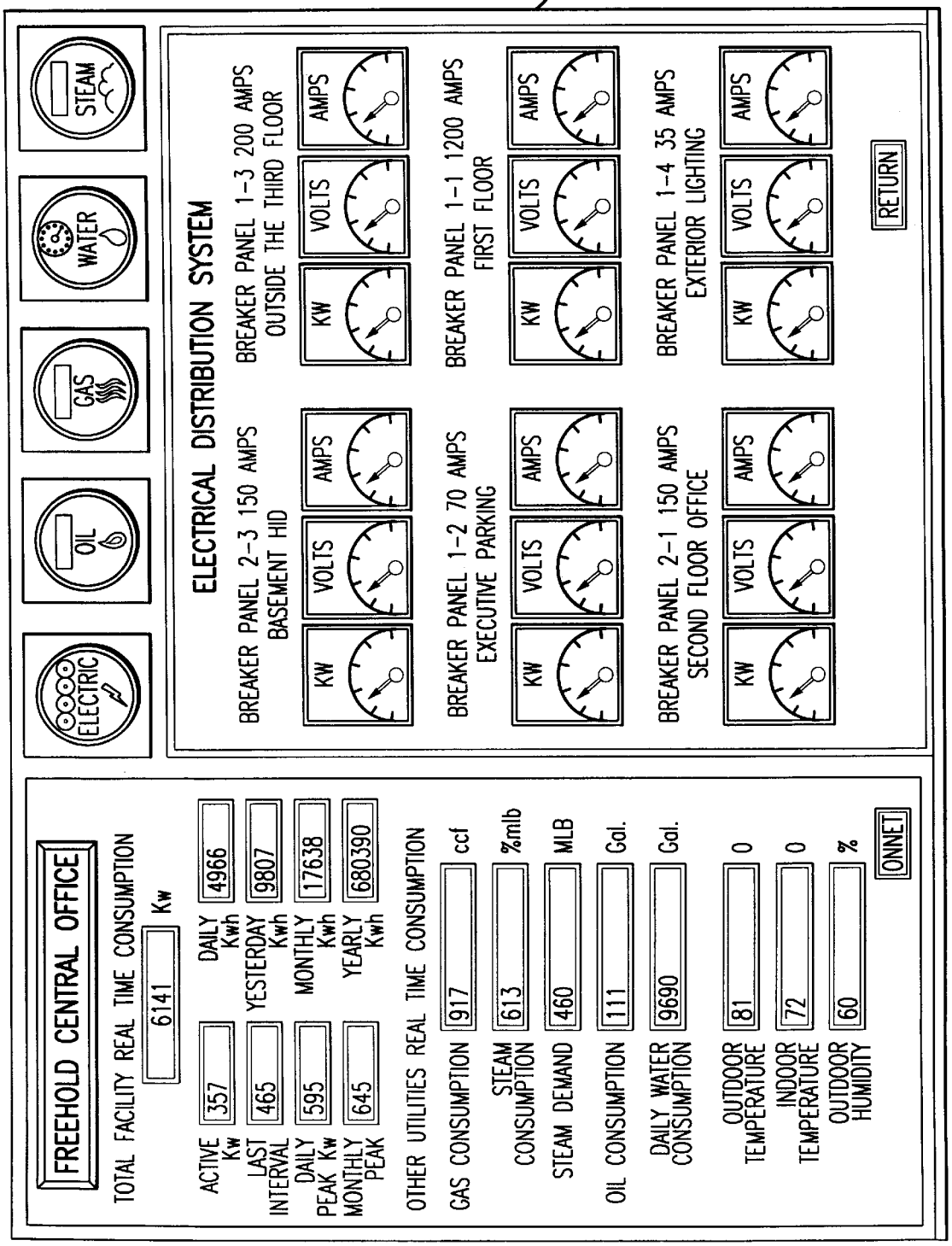

Referring again to FIG. 4, if demand center selection 125 is made, the demand control center screen 261 shown in FIG. 16 will appear. This screen offers a custom module for the reduction of steam demand 263, heat demand 265 and the like. FIGS. 17, 18 and 19 with screens 271, 281 and 291, respectively, show a custom module for HVAC demand, steam demand and electrical information, respectively. By clicking on screen 291, the electrical distribution will appear as shown on screen 301 of FIG. 20.

Figure 21:
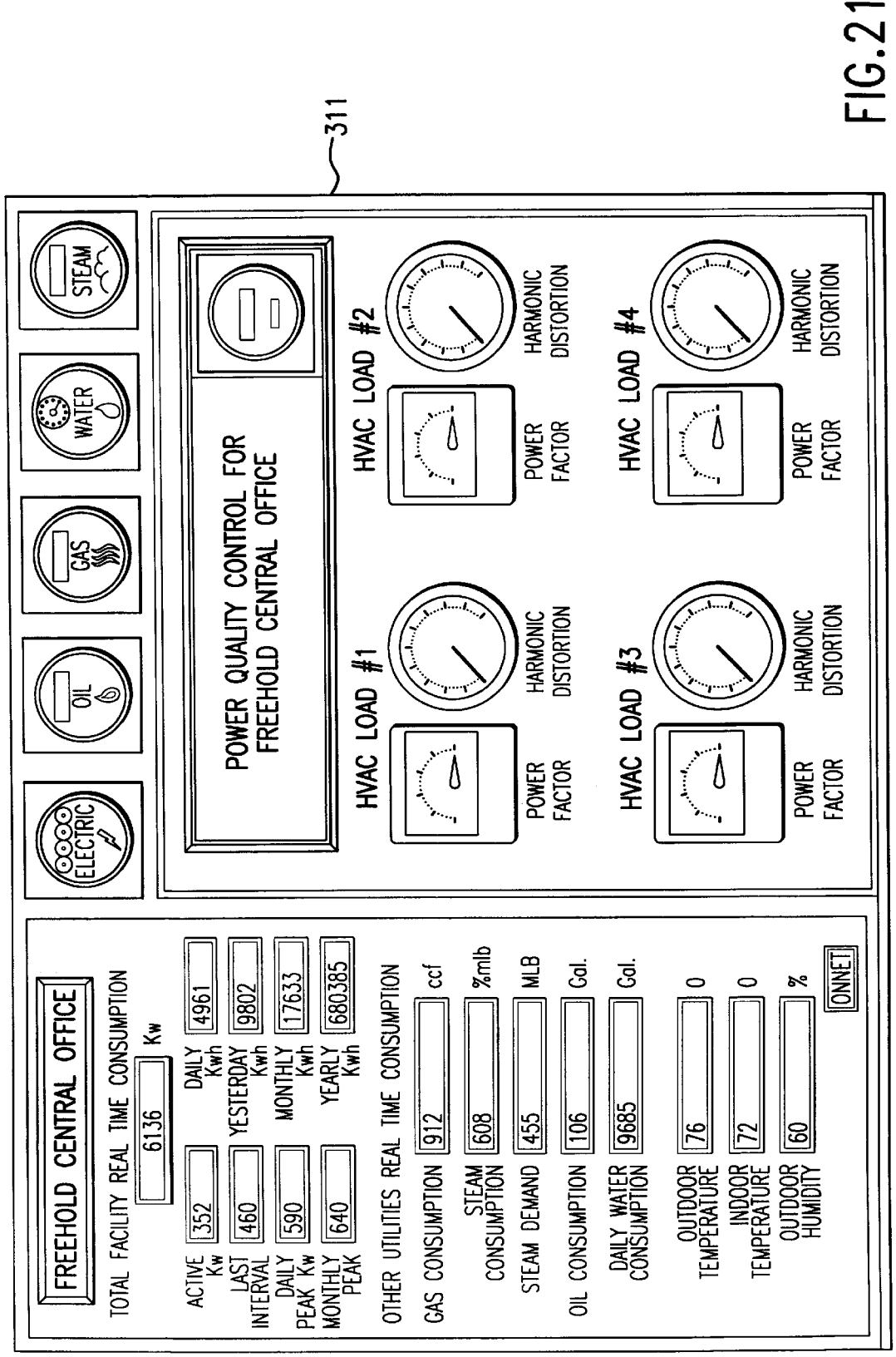
Figure 22:
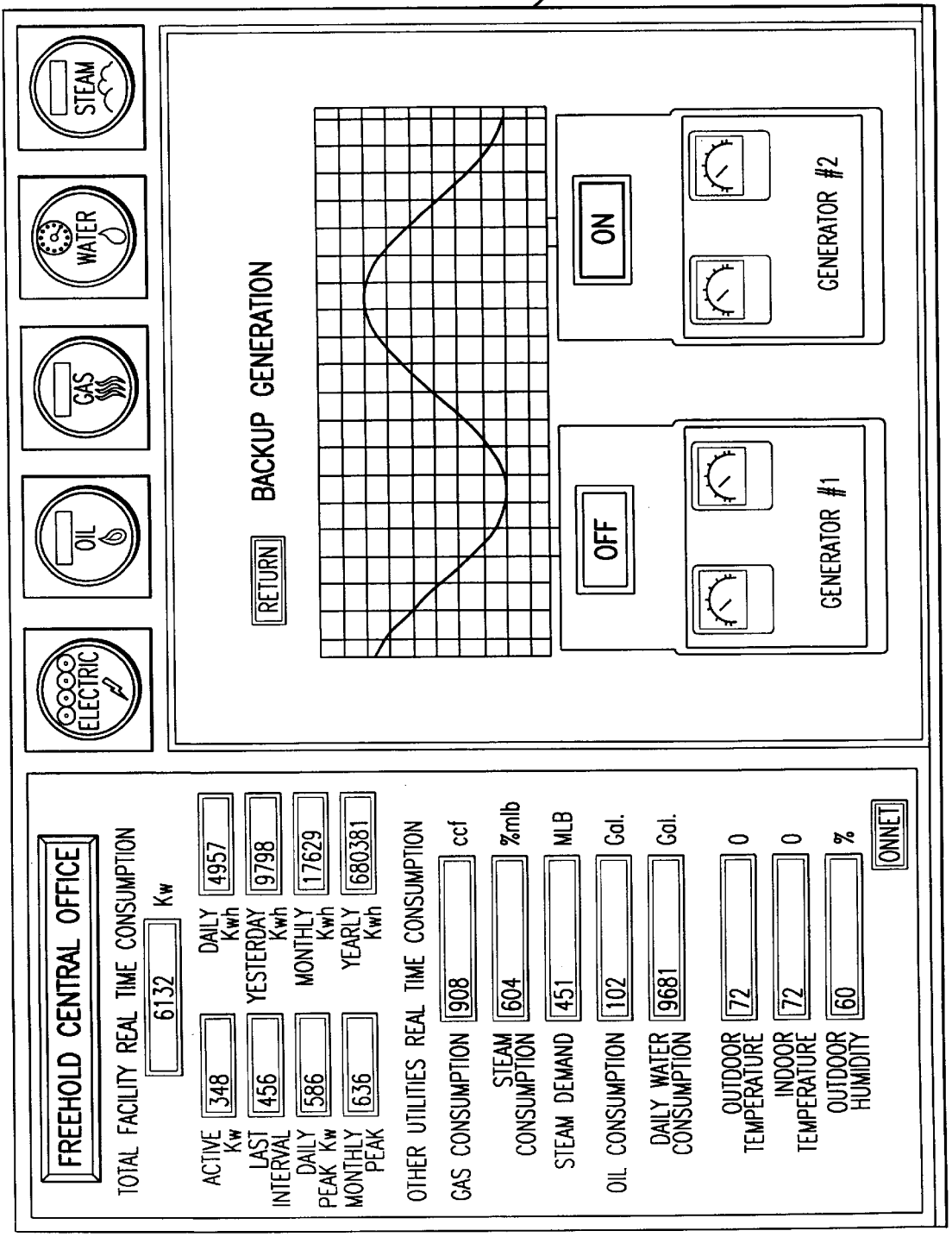
Figure 23:
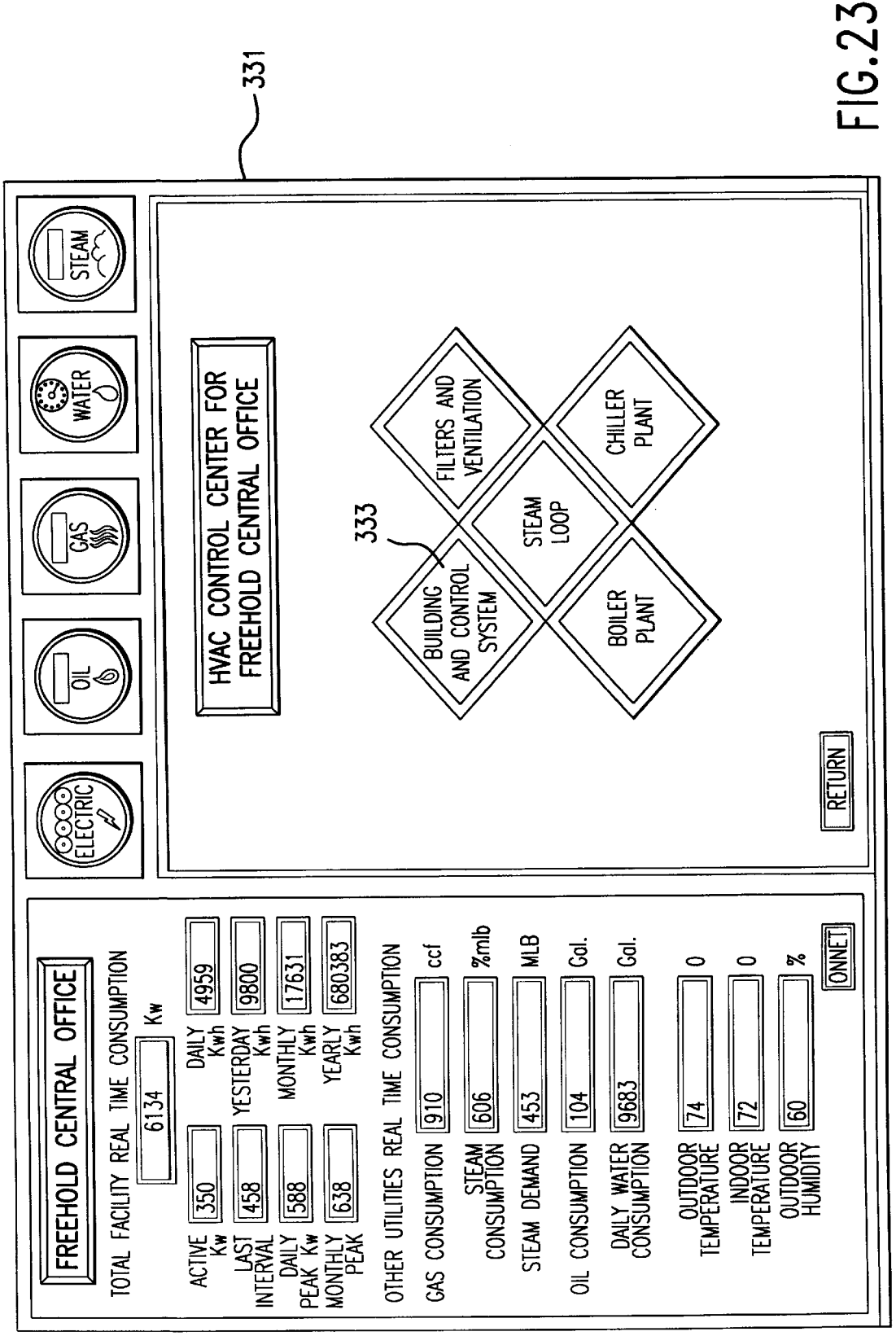
Figure 24:
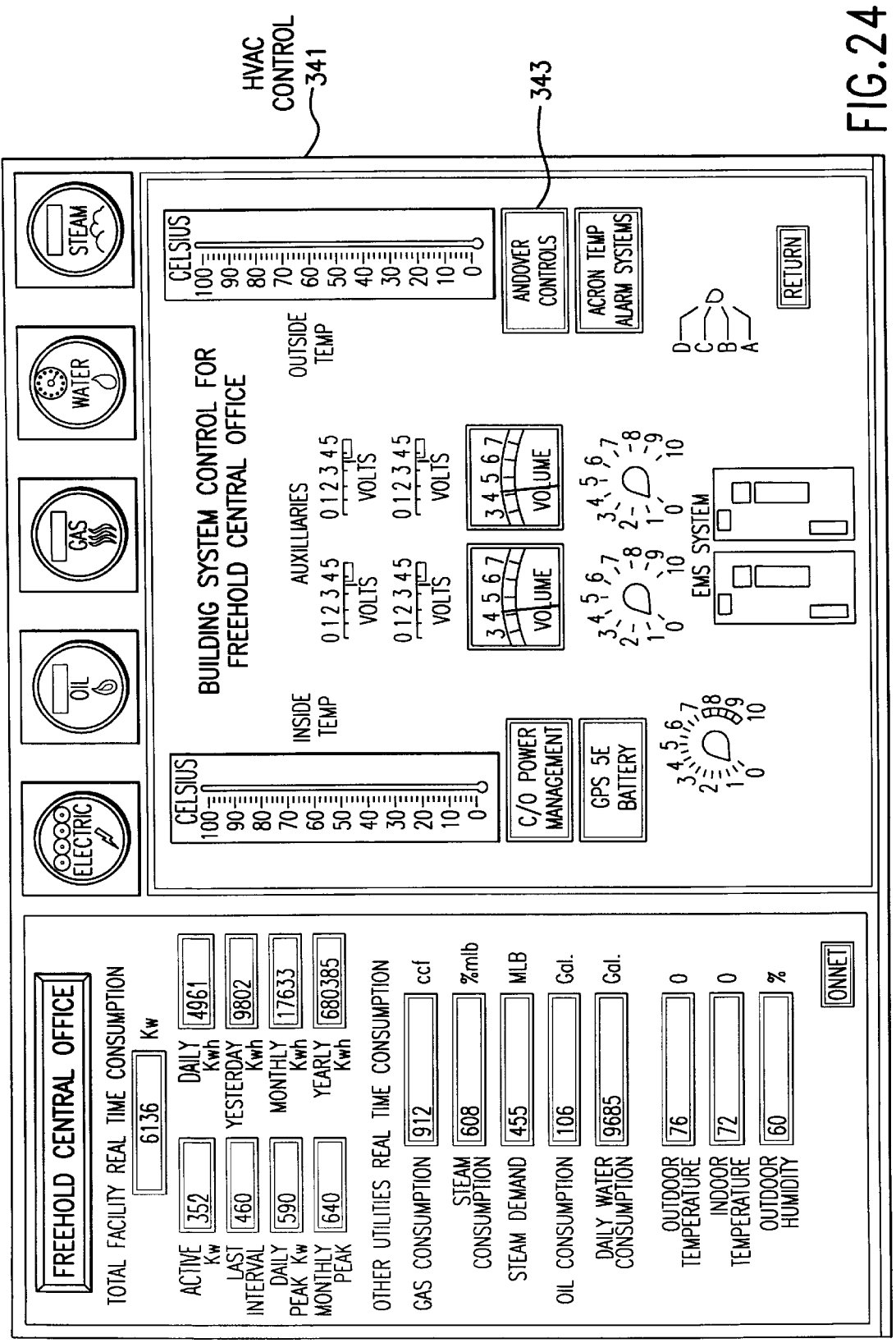
Figure 25:
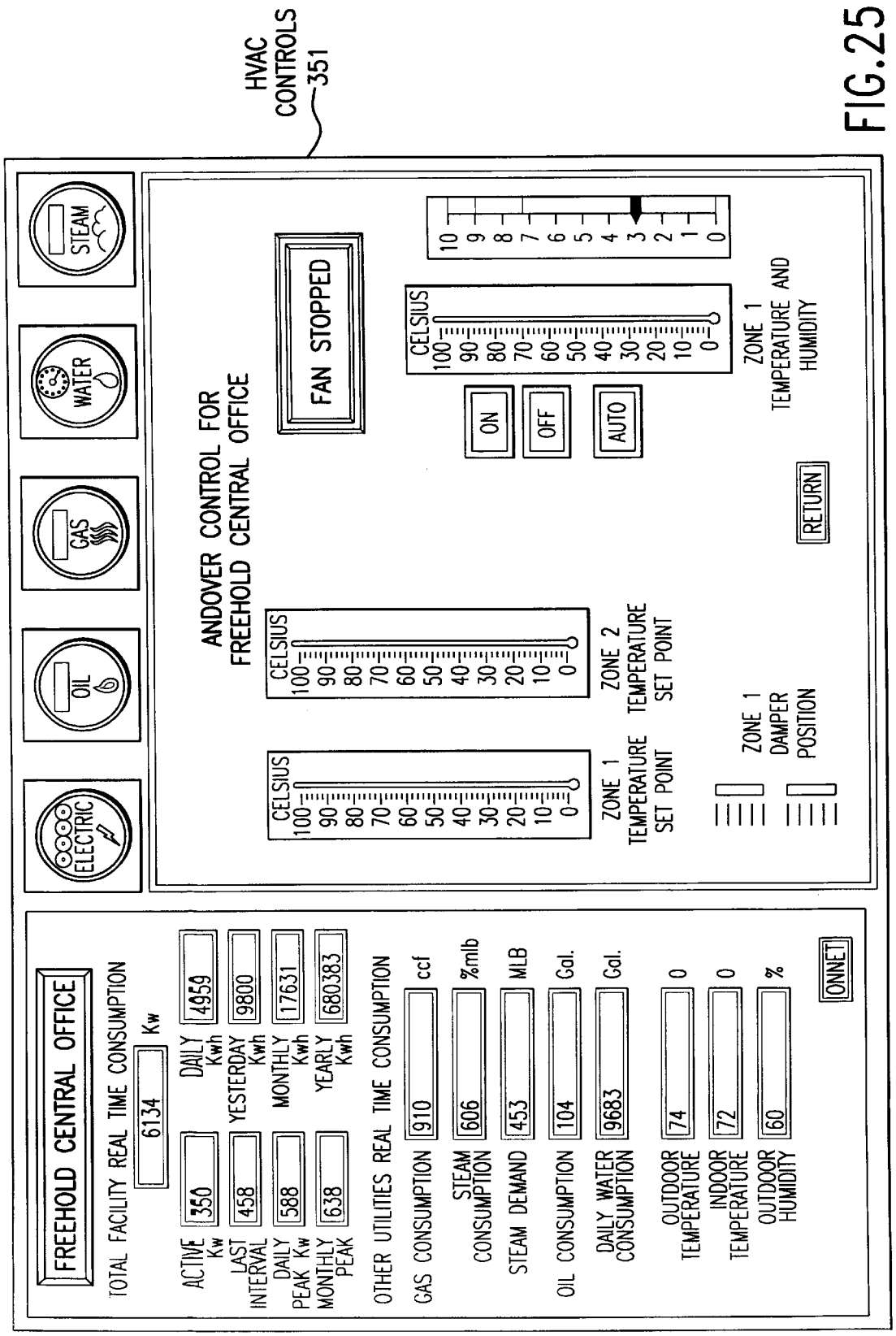
Figure 26:
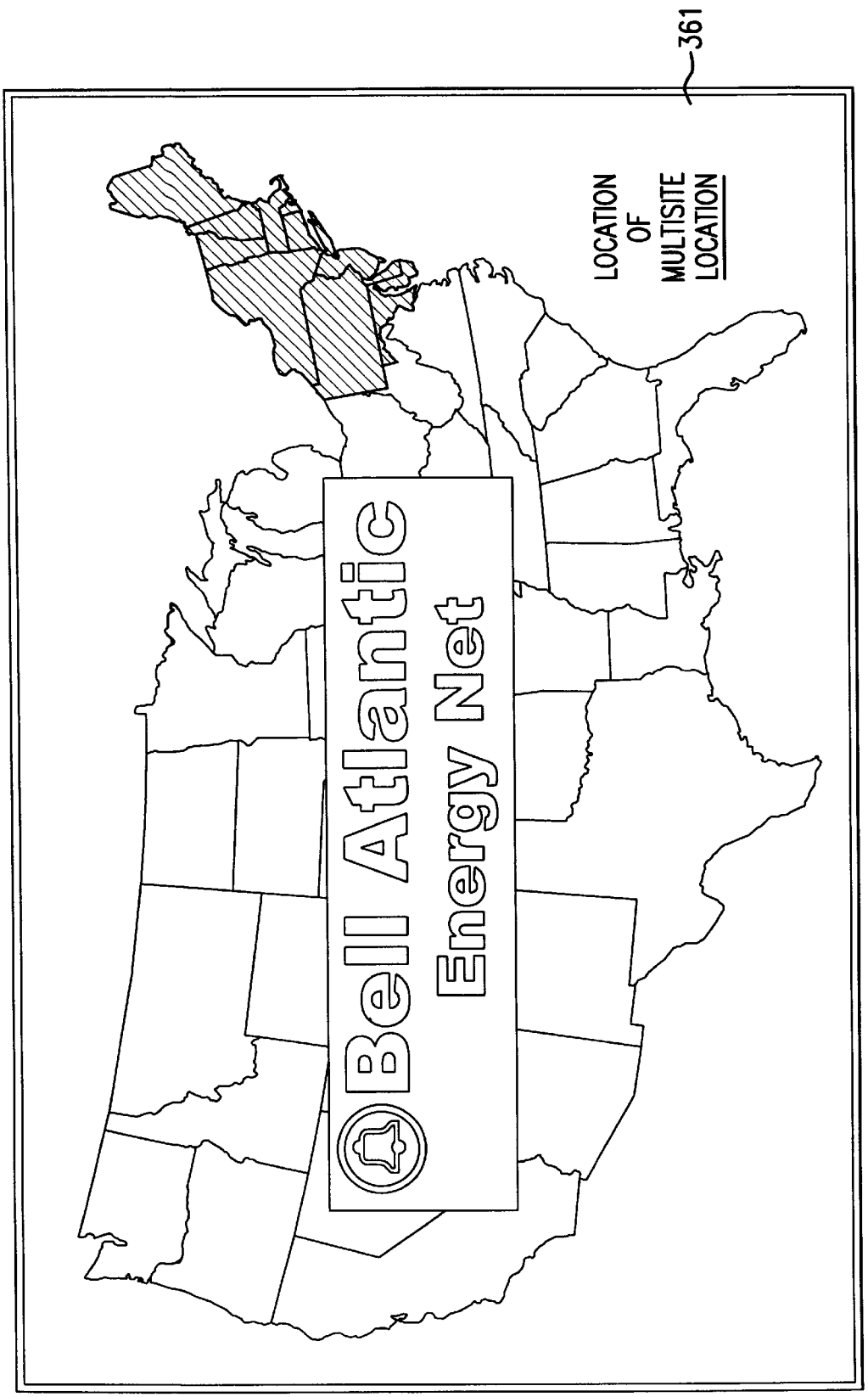
FIGS. 26 through 31 illustrate screens which are used in some preferred embodiments of the present invention software to provide multi-site consolidation, which may be used in conjunction with the screens described above.
Figure 27:
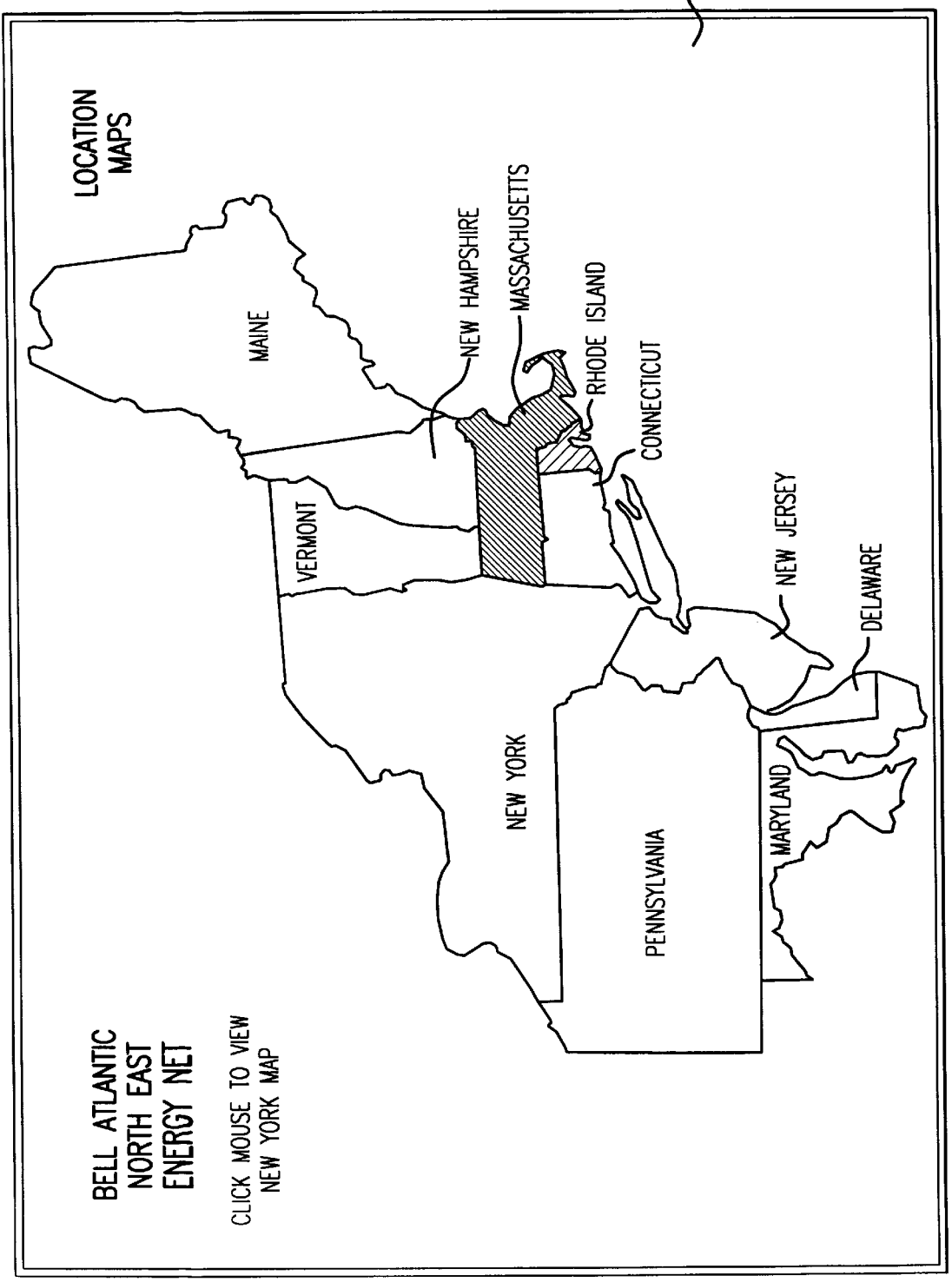
Figure 28:
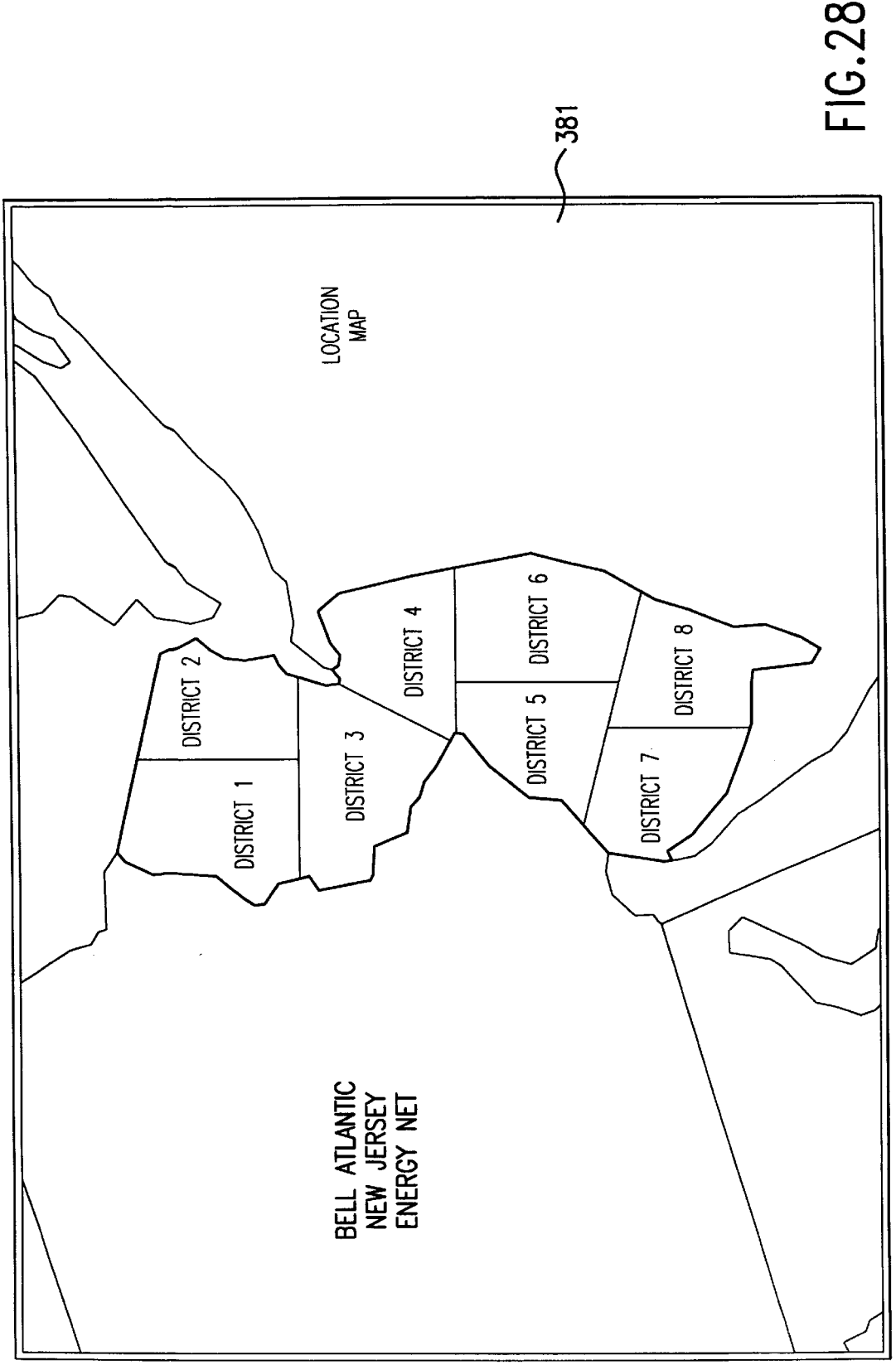
Figure 29:
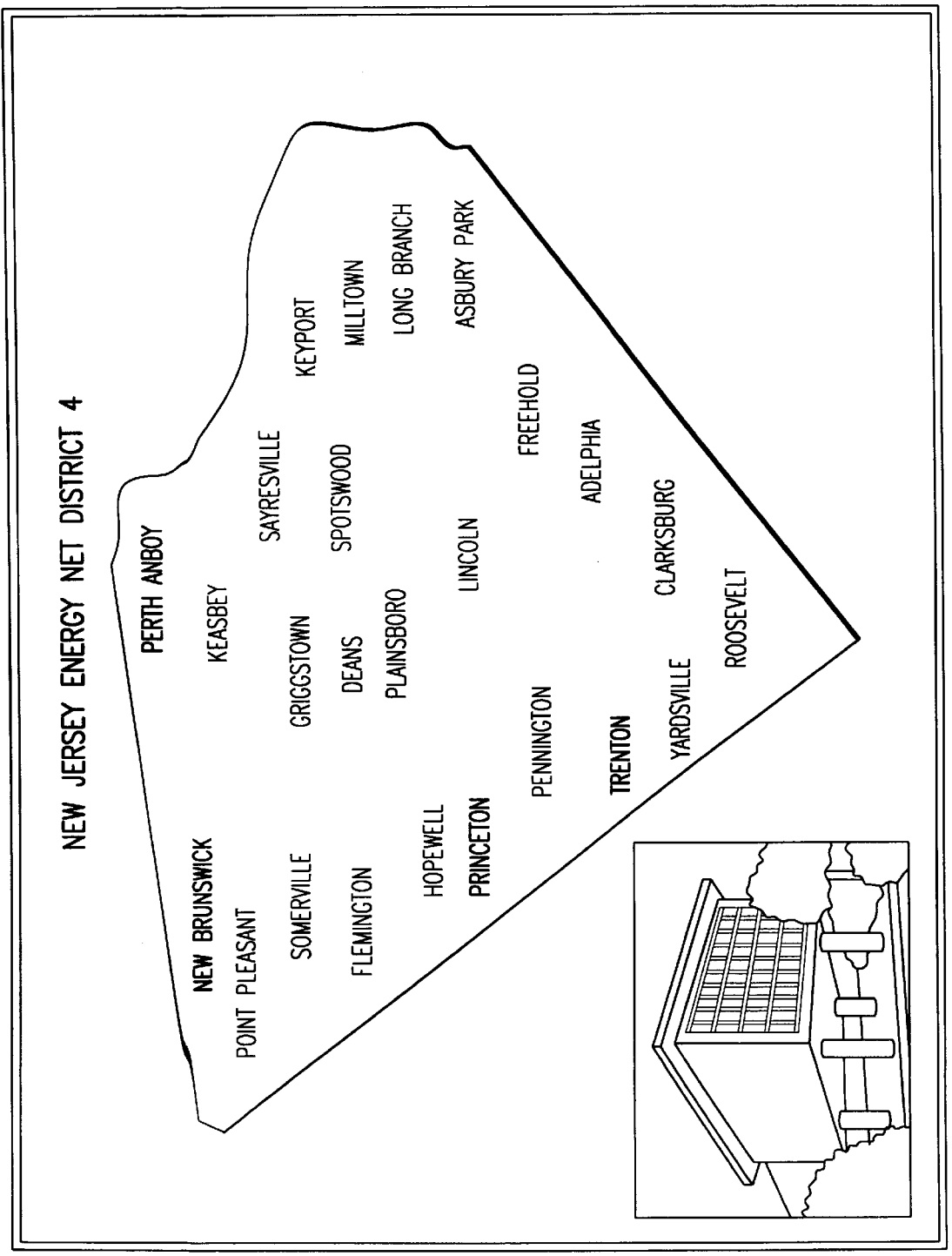
Figure 30:
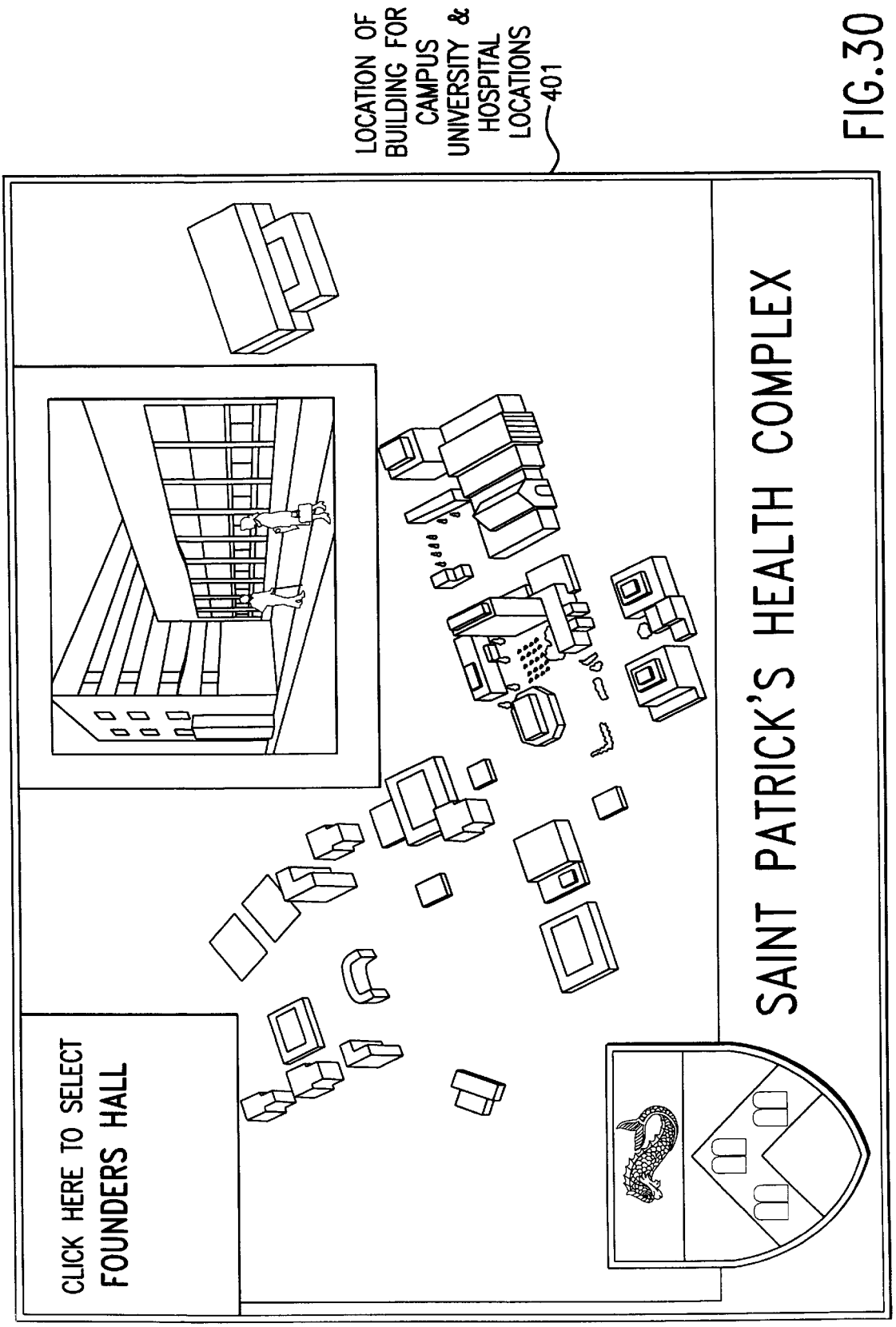

If the module for power quality selection 129 is made from the interface gateway screen 101 of FIG. 4, screen 311 shown in FIG. 21 will appear to provide information pertaining to the power factor and harmonic content in the electric service throughout the customer's facility, power quality control and, likewise, if backup generation module selection 133 is made from the gateway of screen 101 of FIG. 4, backup generation screen 321 of FIG. 22 will be presented with "auto start" sequence information to shed electrical demand, status information and other information, as shown. Similarly, through a series of selections from the HVAC module selection 119 of screen 101 and subsequent subselections, screen 331 of FIG. 23 will appear. The HVAC module integrates existing energy management systems through these system interfaces. If building and control system selection 333 from screen 331 is made screen, 341 of FIG. 24 will appear and will provide the details shown therein. Likewise, screen 351 of FIG. 25 will provide even more details, for example if icon 343 of screen 341 of FIG. 24 is selected.

Figure 31:
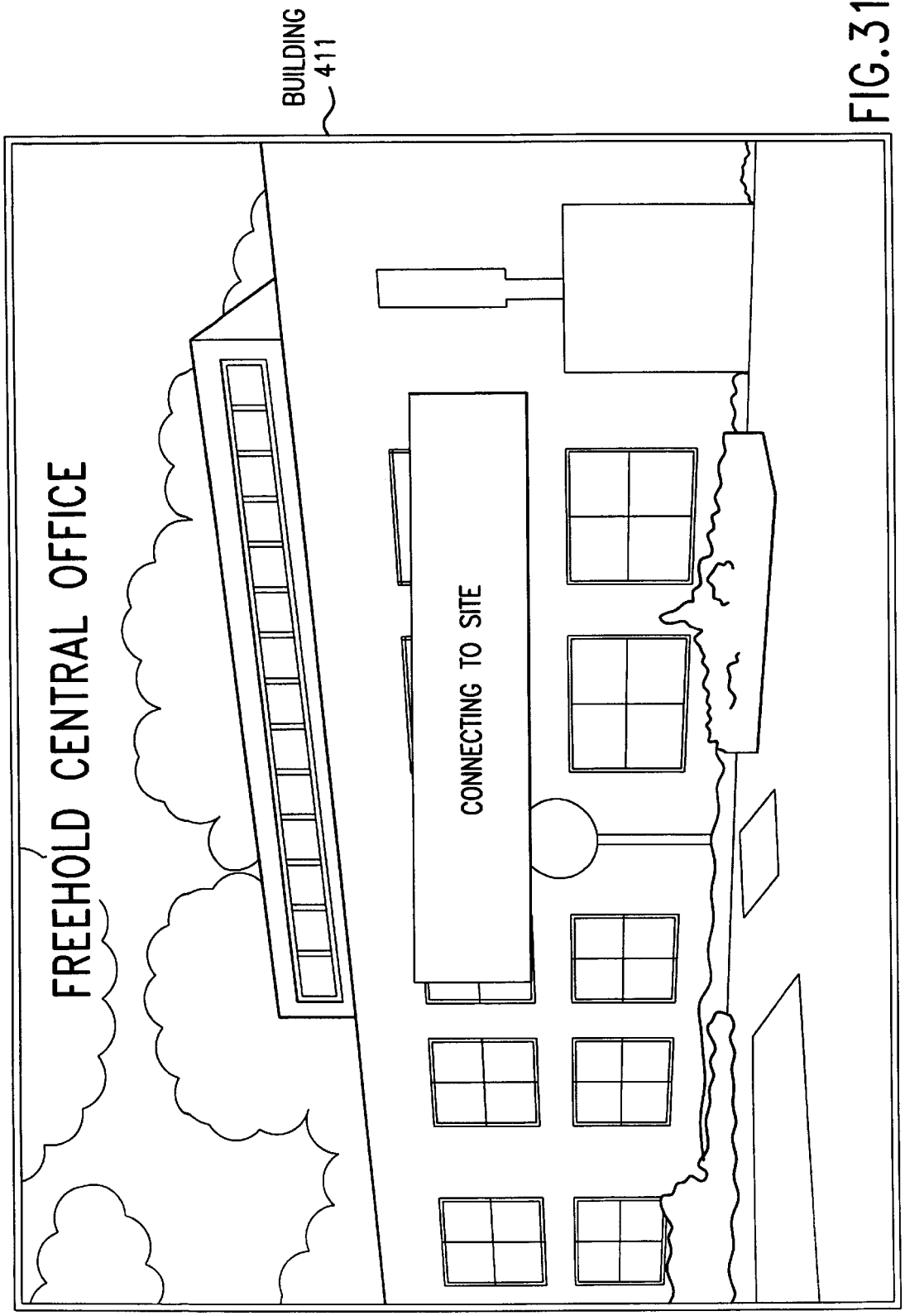

FIGS. 26 through 31 shown screens 361, 371, 381, 391, 401 and 411 which show further and further focused detail of multi location site selections, by providing national, regional, state, district, site and building selections to a user. Once screen 411 of FIG. 31 is obtained, specific site connection may be achieved and the use of the FIG. 4 control dashboard may be tied in for energy data review and collection and provider selection, as described in conjunction with FIGS. 4 through 25 above. These location maps are used to consolidate a multi-site user and provide load aggregation and billing information for these facilities.

Obviously, numerous modifications and variations of the present invention are possible in light of the above teachings. It is therefore understood that within the scope of the appended claims, the invention may be practiced otherwise than as specifically described herein.

What is claimed is:

1. A multi-utility energy control system for monitoring consumption, and cost of resource generation, for a plurality of different utility types with a single master meter and for monitoring and controlling individual utility systems within a facility, for determining possible utility cost adjustments to enhance cost effectiveness, which comprises:

(a) at least one central control computer being connected to a multi-utility master meter device, and both being located within a single facility, said at least one central control computer having sufficient software adapted to receive utility consumption rate data from said master meter and for storing, presenting, analyzing and reporting from said data sufficient information to monitor consumption rates and to compare such information to theoretical and/or historical data to identify unexpected changes in consumption and to identify peak demands, surges and sags, said computer also being connected to a plurality of individual utility consuming systems within a facility, said software also being adopted to control said utility consuming systems by adjusting actual utility consumption in response to predetermined parameters set for each of said utility consuming systems, said software further including at least one dashboard screen and a plurality of utility subscreens relating thereto, said at least one dashboard screen including one which provides a plurality of utility type icons for selection of a utility from said icons, and an interface gateway for selection of other utility related data, and said software further including a plurality of subscreens for presenting (i) selectable utility information from said utility type icons and (ii) selectable utility related data from said interface gateway;

(b) a multi-utility real time master meter for monitoring consumption of a plurality of different utility types with a single master meter, which includes a central processing unit, visual display means connected to the central processing unit, programming controls, a power source connection and a plurality of meter sensor connections; and, (c) a plurality of utility meter sensors connected to said master meter, at least a portion of said utility meter sensors being retrofit sensors attachable to existing utility meters for sensing real time rates from said existing utility meters, and transmitting said real time rates to said central processing unit, said plurality of utility meter sensors including utility meter sensors having means to sense real time rates from electromechanical utility meters which are attachable to outside surfaces of electromechanical utility meters by measuring magnetic flux caused by motion within said electromechanical utility meters as said electromechanical utility meters move during consumption.

2. The system of claim 1 wherein said dashboard screen includes icons for at least two utilities selected from the group consisting of electric, oil, gas, water and steam.

3. The system of claim 1 wherein said interface gateway includes selection indicia for screens, wherein said screens include screens for a fire and sprinkler system, for power quality, for HVAC, for electrical and for lighting.

4. The system of claim 2 wherein said interface gateway includes selection indicia for screens for at least fire and sprinkler system, power quality, HVAC, electrical and lighting.

5. The system of claim 1 wherein said interface gateway includes selection indicia for a screen for a demand center.

6. The system of claim 1 wherein said multi-utility real time master meter central processing unit includes means for receiving real time utility meter consumption rates data from said sensors, means for storing said data, means for presenting said data on display via said visual display means in accordance with a preprogrammed sequence and in preprogrammed time frames, means for converting said data to averages over longer periods of time based on preprogrammed parameters, and means for presenting both real time consumption rate data and converted data to a computer in a predetermined computer language format.

7. The system of claim 1 wherein at least one of said sensors is wired directly to said master meter central processing unit within said housing.

8. The system of claim 1 wherein at least one of said sensors is wired to a signal transmission device for transmitting signals through an alternating current line to said master meter central processing unit and said master meter central processing unit includes a receiver for receiving said signals from said alternating current line and inputting said signals to said master meter central processing unit.

9. The system of claim 1 wherein at least a portion of said meter sensors are current transformers which transmit from about 0 to about 5 milliamps to measure electricity characteristics.

10. The system of claim 1 wherein said at least one central control computer contains software adapted to receive and update alternative utility company competitive pricing information.

11. The system of claim 6 wherein said central control computer software is adapted to provide short term utility contracts for purchase of alternative utility company competitively priced utilities.

12. The system of claim 2 wherein said at least one central control computer contains software adapted to receive and update alternative utility company competitive pricing information.

13. The system of claim 8 wherein said central control computer software is adapted to provide short term utility contracts for purchase of alternative utility company competitively priced utilities.

14. The system of claim 1 wherein said master meter includes a main housing which is physically separate from said at least one central control computer.

15. The system of claim 1 wherein said software further includes a plurality of multi-site consolidation screens and supporting software to enable a user to coordinate utility information for multiple locations in real time.

16. The system of claim 1 wherein said plurality of utility subscreens includes at least a portion of said subscreens having specific real time utility data and at least a portion of said subscreens having the same utility type icons as said dashboard screen to provide interconnection capability from utility to utility.

17. A multi-utility energy control system for monitoring consumption of a plurality of different utility types with a single master meter and for monitoring and controlling individual utility systems within a facility, which comprises:
  (a) at least one central control computer being connected to a multi-utility master meter device, and both being located within a single facility, said at least one central control computer having sufficient software adapted to receive utility consumption rate data from said master meter and for storing, presenting, analyzing and reporting from said data sufficient information to monitor consumption rates and to compare such information to theoretical and/or historical data to identify unexpected changes in consumption and to identify peak demands, surges and sags, said computer also being connected to a plurality of individual utility consuming systems within a facility, said software also being adopted to control said utility consuming systems by adjusting actual utility consumption in response to predetermined parameters set for each of said utility consuming systems, said software further including at least one dashboard screen and a plurality of utility subscreens relating thereto, said at least one dashboard screen including one which provides a plurality of utility type icons for selection of a utility from said icons, and an interface gateway for selection of other utility related data, and said software further including a plurality of subscreens for presenting (i) selectable utility information from said utility type icons and (ii) selectable utility related data from said interface gateway;
  (b) a multi-utility real time master meter for monitoring consumption of a plurality of different utility types with a single master meter, which includes a central processing unit, visual display means connected to the central processing unit, programming controls, a power source connection and a plurality of meter sensor connections; and,
  (c) a plurality of utility meter sensors connected to said master meter, at least a portion of said utility meter sensors being integrally connected to utility meters for sensing real time rates from said utility meters, and transmitting said real time rates to said central processing unit, said plurality of utility meter sensors including utility meter sensors having means to sense real time rates from electromechanical utility meters which are attachable to outside surfaces of electromechanical utility meters by measuring magnetic flux caused by motion within said electromechanical utility meters as said electromechanical utility meters move during consumption.

18. The system of claim 17 wherein said dashboard screen includes icons for at least two utilities selected from the group consisting of electric, oil, gas, water and steam.

19. The system of claim 17 wherein said interface gateway includes selection indicia for screens, wherein said screens include screens for a fire and sprinkler system, for power quality, for HVAC, for electrical and for lighting.

20. The system of claim 18 wherein said interface gateway includes selection indicia for screens, wherein said screens include screens for a fire and sprinkler system, for power quality, for HVAC, for electrical and for lighting.

21. The system of claim 17 wherein said interface gateway includes selection indicia for a screen for a demand center.

22. The system of claim 17 wherein said master meter central processing unit includes means for receiving real time utility meter consumption rates data from said sensors, means for storing said data, means for presenting said data on display via said visual display means in accordance with a preprogrammed sequence and in preprogrammed time frames, means for converting said data to averages over longer periods of time based on preprogrammed parameters, and means for presenting both real time consumption rate data and converted data to a computer in a predetermined computer language format.

23. The system of claim 17 wherein at least one of said sensors is wired directly to said central processing unit within said housing.

24. The system of claim 17 wherein at least one of said sensors is wired to a signal transmission device for transmitting signals through an alternating current line to said central processing unit and said central processing unit includes a receiver for receiving said signals from said alternating current line and inputting said signals to the central processing unit.

25. The system of claim 18 wherein at least one of said sensors is wired to a signal transmission device for transmitting signals through an alternating current line to said central processing unit and said central processing unit includes a receiver for receiving said signals from said alternating current line and inputting said signals to the central processing unit.

26. The system of claim 17 wherein at least a portion of said utility meter sensors are located within said utility meters.

27. The system of claim 18 wherein at least one of said sensors is wired to a signal transmission device for transmitting signals through an alternating current line to said central processing unit and said central processing unit includes a receiver for receiving said signals from said alternating current line and inputting said signals to the central processing unit.

28. The system of claim 17 wherein said at least one central control computer contains software adapted to receive and update alternative utility company competitive pricing information.

29. The system of claim 28 wherein said central control computer software is adapted to provide short term utility contracts for purchase of alternative utility company competitively priced utilities.

30. The system of claim 17 wherein said master meter includes a main housing which is physically separate from said at least one central control computer.

31. The system of claim 17 wherein said software further includes a plurality of multi-site consolidation screens and supporting software to enable a user to coordinate utility information for multiple locations in real time.

32. The system of claim 17 wherein said plurality of utility subscreens includes at least a portion of said subscreens having specific real time utility data and at least a portion of said subscreens having the same utility type icons as said dashboard screen to provide inter capability from utility to utility.

33. In a system for multi-utility energy control for monitoring consumption and cost of resource regeneration for a plurality of different utility types with a single master meter and for monitoring and controlling individual utility systems within a single facility, which system includes a central control computer and sensing meters, said system having software to receive utility consumption rate data and to store, present and analyze report and adjust and control utility consumption, said software including a main screen and subscreens, which comprise:

(a) a dashboard screen having a plurality of utility type icons for selection of a utility from said icons and an interface gateway for selection of other utility related data; and, (b) a plurality of subscreens for presenting (i) selectable utility information from said utility type icons and (ii) selectable utility related data from said interface gateway.

34. The system of claim 33 wherein said dashboard screen includes icons for at least two utilities selected from the group consisting of electric, oil, gas, water and steam.

35. The system of claim 33 wherein said interface gateway includes selection indicia for screens, wherein said screens include screens for modules for a fire and sprinkler system, for power quality, for HVAC, for electrical and for lighting.

36. The system of claim 34 wherein said interface gateway includes selection indicia for screens, wherein said screens include screens for modules for a fire and sprinkler system, for power quality, for HVAC, for electrical and for lighting.

37. The system of claim 33 wherein said interface gateway includes selection indicia for a screen for a demand center.

38. The system of claim 33 wherein said software further includes a plurality of multi-site consolidation screens and supporting software to enable a user to consolidate and coordinate utility information for multiple locations in real time as well as aggregate load demand for regions.

39. The system of claim 33 wherein said plurality of utility subscreens includes at least a portion of said subscreens having specific real time utility data and at least a portion of said subscreens having the same utility type icons as said dashboard screen to provide interconnection capability from utility to utility.

40. The system of claim 33 wherein said interface gateway includes selection indicia for modules for security and backup generation of electricity.

* * * * *